(12) United States Patent
Binder

(10) Patent No.: US 7,876,767 B2
(45) Date of Patent: *Jan. 25, 2011

(54) NETWORK COMBINING WIRED AND NON-WIRED SEGMENTS

(75) Inventor: Yehuda Binder, Hod Hasharon (IL)

(73) Assignee: Mosaid Technologies Incorporated, Ottawa, Ontario (CA)

(*) Notice: Subject to any disclaimer, the term of this patent is extended or adjusted under 35 U.S.C. 154(b) by 1391 days.

This patent is subject to a terminal disclaimer.

(21) Appl. No.: 11/121,075

(22) Filed: May 4, 2005

(65) Prior Publication Data

US 2005/0254516 A1 Nov. 17, 2005

Related U.S. Application Data

(63) Continuation of application No. 10/998,015, filed on Nov. 29, 2004, which is a continuation of application No. 10/890,199, filed on Jul. 14, 2004, which is a continuation of application No. 09/552,564, filed on Apr. 19, 2000, now Pat. No. 6,842,459.

(51) Int. Cl.
*H04L 12/56* (2006.01)
*H04L 12/66* (2006.01)

(52) U.S. Cl. .................. 370/420; 455/557; 370/463

(58) Field of Classification Search .............. 370/338, 370/463, 419–421; 463/40–42, 16, 20–22, 463/25–29
See application file for complete search history.

(56) References Cited

U.S. PATENT DOCUMENTS

| | | |
|---|---|---|
| 2,032,360 A | 3/1936 | Green |
| 2,289,435 A | 10/1942 | Tunick |
| 2,411,786 A | 11/1946 | Halstead |
| 2,577,731 A | 12/1951 | Berger |

(Continued)

FOREIGN PATENT DOCUMENTS

EP 0 798 923 A2 10/1997

(Continued)

OTHER PUBLICATIONS

Evans, Grayson, *CEBus Standard User's Guide: A Complete Technical Overview*, May 1996, Chapters 1, 2, and 4-6; pp. 1-1 to 2-13, 4-1 to 7-89.

(Continued)

*Primary Examiner*—Thai D Hoang
(74) *Attorney, Agent, or Firm*—Browdy and Neimark, PLLC

(57) ABSTRACT

A local area network (60) within a residence or other building, including both wired (5) and non-wired segments (53). The wired segments are based on new or existing wires (5a, 5b, 5c, 5d, 5e) in the building, wherein access to the wires is provided by means of outlets (61a, 61d), such as a telephone system, electrical power distribution system, or cable television wiring system. The non-wired segments are based on communication using propagated waves such as radio, sound, or light (e.g. infrared). The wired and non-wired segments interface in the outlet, using a module (50) that serves as mediator between the segments. The module can be integrated into the outlet, partially housed in the outlet, or attached externally to the outlet. Such a network allows for integrated communication of data units (24b) connected by wires and data units (24a, 24d) connected without wires.

30 Claims, 8 Drawing Sheets

U.S. PATENT DOCUMENTS

| | | |
|---|---|---|
| 3,045,066 A | 7/1962 | Beuscher |
| 3,280,259 A | 10/1966 | Cotter |
| 3,334,340 A | 8/1967 | McConnell |
| 3,369,078 A | 2/1968 | Stradley |
| 3,508,243 A | 4/1970 | Nyfeler et al. |
| 3,509,537 A | 4/1970 | Haberly |
| 3,540,030 A | 11/1970 | Hartz |
| 3,590,271 A | 6/1971 | Peters |
| 3,594,584 A | 7/1971 | Woods |
| 3,654,605 A | 4/1972 | Honda et al. |
| 3,656,112 A | 4/1972 | Paull |
| 3,662,366 A | 5/1972 | Neuville et al. |
| 3,683,343 A | 8/1972 | Feldman et al. |
| 3,689,886 A | 9/1972 | Durkee |
| 3,702,460 A | 11/1972 | Blose |
| 3,710,373 A | 1/1973 | Watanabe et al. |
| 3,714,451 A | 1/1973 | Whitney et al. |
| 3,719,928 A | 3/1973 | Oishi et at |
| 3,721,830 A | 3/1973 | Oishi et al. |
| 3,733,586 A | 5/1973 | Lusk et al. |
| 3,771,069 A | 11/1973 | Levacher et al. |
| 3,796,920 A | 3/1974 | Hedrick et al. |
| 3,805,265 A | 4/1974 | Lester |
| 3,810,096 A | 5/1974 | Kabat et at |
| 3,818,481 A | 6/1974 | Dorfman et al. |
| 3,846,638 A | 11/1974 | Wetherell |
| 3,876,984 A | 4/1975 | Chertok |
| 3,898,566 A | 8/1975 | Switzer et al. |
| 3,909,618 A | 9/1975 | Fujii et al. |
| 3,909,821 A | 9/1975 | Jagoda et al. |
| 3,911,415 A | 10/1975 | Whyte |
| 3,922,664 A | 11/1975 | Wadsworth |
| 3,924,223 A | 12/1975 | Whyte et at |
| 3,925,728 A | 12/1975 | Whyte |
| 3,925,763 A | 12/1975 | Wadhwani et at |
| 3,938,129 A | 2/1976 | Smither |
| 3,942,168 A | 3/1976 | Whyte |
| 3,942,170 A | 3/1976 | Whyte |
| 3,944,723 A | 3/1976 | Fong |
| 3,949,172 A | 4/1976 | Brown et al. |
| 3,962,547 A | 6/1976 | Pattantyus-Abraham |
| 3,964,048 A | 6/1976 | Lusk et al. |
| 3,967,264 A | 6/1976 | Whyte et al. |
| 3,973,087 A | 8/1976 | Fong |
| 3,973,240 A | 8/1976 | Fong |
| 3,980,954 A | 9/1976 | Whyte |
| 3,993,989 A | 11/1976 | Held et al. |
| 4,004,110 A | 1/1977 | Whyte |
| 4,008,467 A | 2/1977 | Pattantyus-Abraham et al. |
| 4,012,733 A | 3/1977 | Whyte |
| 4,012,734 A | 3/1977 | Jagoda et al. |
| 4,016,429 A | 4/1977 | Vercellotti et al. |
| 4,024,528 A | 5/1977 | Boggs et al. |
| 4,032,911 A | 6/1977 | Melvin, Jr. |
| 4,057,793 A | 11/1977 | Johnson et al. |
| 4,058,678 A | 11/1977 | Dunn et al. |
| 4,060,735 A | 11/1977 | Pascucci et al. |
| 4,065,763 A | 12/1977 | Whyte et al. |
| 4,066,912 A | 1/1978 | Wetherell |
| 4,085,678 A | 4/1978 | Heincker |
| 4,090,184 A | 5/1978 | Hamilton, II |
| 4,106,077 A | 8/1978 | Furda |
| 4,130,861 A | 12/1978 | LaForest |
| 4,130,874 A | 12/1978 | Pai |
| 4,135,181 A | 1/1979 | Bogacki et al. |
| 4,136,319 A | 1/1979 | Bourde |
| 4,139,735 A | 2/1979 | Dorfman et al. |
| 4,142,178 A | 2/1979 | Whyte et al. |
| 4,161,027 A | 7/1979 | Russell |
| 4,161,720 A | 7/1979 | Bogacki |
| 4,163,218 A | 7/1979 | Wu |
| 4,173,754 A | 11/1979 | Feiker |
| 4,174,517 A | 11/1979 | Mandel |
| 4,188,619 A | 2/1980 | Perkins |
| 4,199,761 A | 4/1980 | Whyte et al. |
| 4,200,862 A | 4/1980 | Campbell et al. |
| 4,205,360 A | 5/1980 | Drucker |
| 4,210,901 A | 7/1980 | Whyte et al. |
| 4,216,543 A | 8/1980 | Cagle et al. |
| 4,222,035 A | 9/1980 | Lohoff |
| 4,245,215 A | 1/1981 | O'Connor et al. |
| 4,250,489 A | 2/1981 | Dudash et al. |
| 4,254,403 A | 3/1981 | Perez-Cavero et al. |
| 4,270,206 A | 5/1981 | Hughes |
| 4,300,126 A | 11/1981 | Gajjar |
| 4,302,750 A | 11/1981 | Wadhwani et al. |
| 4,303,993 A | 12/1981 | Panepinto, Jr. et al. |
| 4,307,380 A | 12/1981 | Gander |
| 4,311,964 A | 1/1982 | Boykin |
| 4,321,581 A | 3/1982 | Tappeiner et al. |
| 4,323,882 A | 4/1982 | Gajjar |
| 4,329,678 A | 5/1982 | Hatfield |
| 4,344,066 A | 8/1982 | Beggs |
| 4,348,582 A | 9/1982 | Budek |
| 4,348,668 A | 9/1982 | Gurr et al. |
| 4,355,303 A | 10/1982 | Phillips et al. |
| 4,357,598 A | 11/1982 | Melvin, Jr. |
| 4,357,605 A | 11/1982 | Clements |
| 4,371,867 A | 2/1983 | Gander |
| 4,377,804 A | 3/1983 | Suzuki |
| 4,380,009 A | 4/1983 | Long et al. |
| 4,382,248 A | 5/1983 | Pai |
| 4,386,436 A | 5/1983 | Kocher et al. |
| 4,400,688 A | 8/1983 | Johnston et al. |
| 4,402,059 A | 8/1983 | Kennon et al. |
| 4,408,185 A | 10/1983 | Rasmussen |
| 4,408,186 A | 10/1983 | Howell |
| 4,417,207 A | 11/1983 | Sato |
| 4,418,333 A | 11/1983 | Schwarzbach et al. |
| 4,419,758 A | 12/1983 | Dorey |
| 4,427,968 A | 1/1984 | York |
| 4,429,299 A | 1/1984 | Kabat et al. |
| 4,430,639 A | 2/1984 | Bennett et al. |
| 4,433,284 A | 2/1984 | Perkins |
| 4,433,326 A | 2/1984 | Howell |
| 4,438,519 A | 3/1984 | Bose |
| 4,442,319 A | 4/1984 | Treidl |
| 4,456,925 A | 6/1984 | Skerlos et al. |
| 4,458,236 A | 7/1984 | Perkins |
| 4,459,434 A | 7/1984 | Benning et al. |
| 4,462,113 A | 7/1984 | Iwata |
| 4,467,140 A | 8/1984 | Fathauer et al. |
| 4,467,314 A | 8/1984 | Weikel et al. |
| 4,468,538 A | 8/1984 | Cripps |
| 4,468,792 A | 8/1984 | Baker et al. |
| 4,471,399 A | 9/1984 | Udren |
| 4,473,816 A | 9/1984 | Perkins |
| 4,473,817 A | 9/1984 | Perkins |
| 4,475,193 A | 10/1984 | Brown |
| 4,479,033 A | 10/1984 | Brown |
| 4,479,215 A | 10/1984 | Baker |
| 4,481,501 A | 11/1984 | Perkins |
| 4,509,211 A | 4/1985 | Robbins |
| 4,510,611 A | 4/1985 | Dougherty |
| 4,514,594 A | 4/1985 | Brown et al. |
| 4,523,307 A | 6/1985 | Brown et al. |
| 4,528,667 A | 7/1985 | Fruhauf |
| 4,535,447 A | 8/1985 | Rosanes et al. |
| 4,538,136 A | 8/1985 | Drabing |
| 4,551,721 A | 11/1985 | Kozlik |
| 4,556,864 A | 12/1985 | Roy |
| 4,556,865 A | 12/1985 | Fukagawa et al. |
| 4,556,866 A | 12/1985 | Gorecki |
| 4,559,520 A | 12/1985 | Johnston |

| | | | | | |
|---|---|---|---|---|---|
| 4,567,557 A | 1/1986 | Burns | 4,996,709 A | 2/1991 | Heep et al. |
| 4,577,333 A | 3/1986 | Lewis et al. | 4,999,613 A | 3/1991 | Williamson et al. |
| 4,580,276 A | 4/1986 | Andruzzi, Jr. et al. | 5,018,138 A | 5/1991 | Twitty et al. |
| 4,597,082 A | 6/1986 | Hill et al. | 5,029,334 A | 7/1991 | Braun et al. |
| 4,599,598 A | 7/1986 | Komoda et al. | 5,032,833 A | 7/1991 | Laporte |
| 4,602,240 A | 7/1986 | Perkins et al. | 5,034,882 A | 7/1991 | Eisenhard et al. |
| 4,609,839 A | 9/1986 | Howell | 5,045,948 A | 9/1991 | Streck et al. |
| 4,611,274 A | 9/1986 | Machino et al. | 5,049,876 A | 9/1991 | Kahle et al. |
| 4,633,218 A | 12/1986 | Palsgrove et al. | 5,051,720 A | 9/1991 | Kittirutsunetorn |
| 4,636,771 A | 1/1987 | Ochs | 5,065,133 A | 11/1991 | Howard |
| 4,638,298 A | 1/1987 | Spiro | 5,066,939 A | 11/1991 | Mansfield, Jr. |
| 4,638,299 A | 1/1987 | Campbell | 5,068,890 A | 11/1991 | Nilssen |
| 4,641,126 A | 2/1987 | Crowe | 5,070,442 A | 12/1991 | Syron-Townson et al. |
| 4,641,322 A | 2/1987 | Hasegawa | 5,070,522 A | 12/1991 | Nilssen |
| 4,642,607 A | 2/1987 | Strom et al. | 5,090,024 A | 2/1992 | Vander Mey et al. |
| 4,644,321 A | 2/1987 | Kennon | 5,090,052 A | 2/1992 | Nakajima et al. |
| 4,668,934 A | 5/1987 | Shuey | 5,093,828 A | 3/1992 | Braun et al. |
| 4,675,648 A | 6/1987 | Roth et al. | 5,099,444 A | 3/1992 | Wilson et al. |
| 4,686,382 A | 8/1987 | Shuey | 5,109,222 A | 4/1992 | Welty |
| 4,686,641 A | 8/1987 | Evans | 5,113,498 A | 5/1992 | Evan et al. |
| 4,692,761 A | 9/1987 | Robinton | 5,115,463 A | 5/1992 | Moldavsky et al. |
| 4,697,166 A | 9/1987 | Warnagiris et al. | 5,142,397 A | 8/1992 | Dockery |
| 4,701,945 A | 10/1987 | Pedigo | 5,146,471 A | 9/1992 | Cowart |
| 4,703,306 A | 10/1987 | Barritt | 5,150,365 A | 9/1992 | Hirata et al. |
| 4,706,274 A | 11/1987 | Baker et al. | 5,151,838 A | 9/1992 | Dockery |
| 4,714,912 A | 12/1987 | Roberts et al. | 5,155,466 A | 10/1992 | Go |
| 4,731,821 A | 3/1988 | Jackson, III | 5,161,021 A | 11/1992 | Tsai |
| 4,745,391 A | 5/1988 | Gajjar | 5,168,510 A | 12/1992 | Hill |
| 4,745,392 A | 5/1988 | Ise et al. | 5,185,591 A | 2/1993 | Shuey |
| 4,746,809 A | 5/1988 | Coleman et al. | 5,187,803 A | 2/1993 | Sohner et al. |
| 4,746,897 A | 5/1988 | Shuey | 5,187,865 A | 2/1993 | Dolin, Jr. |
| 4,749,992 A | 6/1988 | Fitzemeyer et al. | 5,192,231 A | 3/1993 | Dolin, Jr. |
| 4,755,792 A | 7/1988 | Pezzolo et al. | 5,198,796 A | 3/1993 | Hessling, Jr. |
| 4,763,103 A | 8/1988 | Galula et al. | 5,210,518 A | 5/1993 | Graham et al. |
| 4,763,104 A | 8/1988 | Inoue et al. | 5,210,519 A | 5/1993 | Moore |
| 4,766,402 A | 8/1988 | Crane | 5,210,788 A | 5/1993 | Nilssen |
| 4,766,414 A | 8/1988 | Shuey | 5,230,086 A | 7/1993 | Saul |
| 4,769,837 A | 9/1988 | McCormick et al. | 5,241,283 A | 8/1993 | Sutterlin |
| 4,772,870 A | 9/1988 | Reyes | 5,255,267 A | 10/1993 | Hansen et al. |
| 4,782,322 A | 11/1988 | Lechner et al. | 5,255,268 A | 10/1993 | Cato et al. |
| 4,785,448 A | 11/1988 | Reichert et al. | 5,257,006 A | 10/1993 | Graham et al. |
| 4,800,363 A | 1/1989 | Braun et al. | 5,262,755 A | 11/1993 | Mak et al. |
| 4,809,296 A | 2/1989 | Braun et al. | 5,263,046 A | 11/1993 | Vander Mey |
| 4,815,106 A | 3/1989 | Propp et al. | 5,264,823 A | 11/1993 | Stevens |
| 4,821,319 A | 4/1989 | Middleton et al. | 5,265,150 A | 11/1993 | Helmkamp et al. |
| 4,829,570 A | 5/1989 | Schotz | 5,268,666 A | 12/1993 | Michel et al. |
| 4,835,517 A | 5/1989 | van der Gracht et al. | 5,274,631 A | 12/1993 | Bhardwaj |
| 4,841,281 A | 6/1989 | Melvin, Jr. | 5,276,918 A | 1/1994 | Cornforth et al. |
| 4,845,466 A | 7/1989 | Hariton et al. | 5,278,862 A | 1/1994 | Vander Mey |
| 4,847,903 A | 7/1989 | Schotz | 5,289,476 A | 2/1994 | Johnson et al. |
| 4,850,009 A | 7/1989 | Zook et al. | 5,297,203 A | 3/1994 | Rose et al. |
| 4,864,588 A | 9/1989 | Simpson et al. | 5,319,634 A | 6/1994 | Bartholomew et al. |
| 4,864,589 A | 9/1989 | Endo | 5,321,736 A | 6/1994 | Beasley |
| 4,866,733 A | 9/1989 | Morishita | 5,321,846 A | 6/1994 | Yokota et al. |
| 4,866,757 A | 9/1989 | Nilssen | 5,334,975 A | 8/1994 | Wachob et al. |
| 4,885,563 A | 12/1989 | Johnson et al. | 5,345,437 A | 9/1994 | Ogawa |
| 4,885,564 A | 12/1989 | Vercellotti et al. | 5,347,549 A | 9/1994 | Baumann et al. |
| 4,885,766 A | 12/1989 | Yasuoka et al. | 5,349,644 A | 9/1994 | Massey et al. |
| 4,885,803 A | 12/1989 | Hermann et al. | 5,351,272 A | 9/1994 | Abraham |
| 4,890,089 A | 12/1989 | Shuey | 5,352,957 A | 10/1994 | Werner |
| 4,896,277 A | 1/1990 | Vercellotti et al. | 5,355,114 A | 10/1994 | Sutterlin et al. |
| 4,901,218 A | 2/1990 | Cornwell | 5,369,356 A | 11/1994 | Kinney et al. |
| 4,903,006 A | 2/1990 | Boomgaard | 5,377,255 A | 12/1994 | Beasley |
| 4,912,553 A | 3/1990 | Pal et al. | 5,381,459 A | 1/1995 | Lappington |
| 4,914,418 A | 4/1990 | Mak et al. | 5,390,235 A | 2/1995 | Beasley |
| 4,918,690 A | 4/1990 | Markkula, Jr. et al. | 5,400,246 A | 3/1995 | Wilson et al. |
| 4,962,496 A | 10/1990 | Vercellotti et al. | 5,404,127 A | 4/1995 | Lee et al. |
| 4,963,853 A | 10/1990 | Mak | 5,404,570 A | 4/1995 | Charas et al. |
| 4,968,970 A | 11/1990 | LaPorte | 5,406,248 A | 4/1995 | Le Van Suu |
| 4,973,940 A | 11/1990 | Sakai et al. | 5,406,249 A | 4/1995 | Pettus |
| 4,979,183 A | 12/1990 | Cowart | 5,410,292 A | 4/1995 | Le Van Suu |
| 4,980,665 A | 12/1990 | Schotz | 5,412,369 A | 5/1995 | Kirchner |
| 4,988,972 A | 1/1991 | Takagi | 5,432,838 A | 7/1995 | Purchase et al. |

| | | | | | | |
|---|---|---|---|---|---|---|
| 5,448,593 A | 9/1995 | Hill | | 5,818,710 A | 10/1998 | LeVan Suu |
| 5,452,344 A | 9/1995 | Larson | | 5,818,821 A | 10/1998 | Schurig |
| 5,459,459 A | 10/1995 | Lee, Jr. | | 5,828,293 A | 10/1998 | Rickard |
| 5,461,629 A | 10/1995 | Sutterlin et al. | | 5,828,663 A | 10/1998 | Ikegami |
| 5,467,011 A | 11/1995 | Hunt | | 5,832,364 A | 11/1998 | Gustafson |
| 5,471,190 A | 11/1995 | Zimmermann | | 5,832,365 A | 11/1998 | Chen et al. |
| 5,475,363 A | 12/1995 | Suzuki et al. | | 5,835,005 A | 11/1998 | Furukawa et al. |
| 5,481,249 A | 1/1996 | Sato | | 5,835,863 A | 11/1998 | Ikenouchi et al. |
| 5,485,040 A | 1/1996 | Sutterlin | | 5,838,226 A | 11/1998 | Houggy et al. |
| 5,489,894 A | 2/1996 | Murray | | 5,841,360 A | 11/1998 | Binder |
| 5,497,142 A | 3/1996 | Chaffanjon | | 5,841,841 A | 11/1998 | Dodds et al. |
| 5,504,454 A | 4/1996 | Daggett et al. | | 5,844,789 A | 12/1998 | Wynn |
| 5,521,491 A | 5/1996 | Najam | | 5,844,949 A | 12/1998 | Hershey et al. |
| 5,533,101 A | 7/1996 | Miyagawa | | 5,848,054 A | 12/1998 | Mosebrook et al. |
| 5,537,637 A | 7/1996 | Sugita et al. | | 5,864,284 A | 1/1999 | Sanderson |
| 5,539,821 A | 7/1996 | Blonder | | 5,870,016 A | 2/1999 | Shrestha |
| 5,554,968 A | 9/1996 | Lee | | 5,892,430 A | 4/1999 | Wiesman et al. |
| 5,559,377 A | 9/1996 | Abraham | | 5,892,795 A | 4/1999 | Paret |
| 5,565,855 A | 10/1996 | Knibbe | | 5,896,443 A | 4/1999 | Dichter |
| 5,570,085 A | 10/1996 | Bertsch | | 5,896,569 A | 4/1999 | Butler et al. |
| 5,572,575 A | 11/1996 | Yamamoto et al. | | 5,898,347 A | 4/1999 | Harford |
| 5,574,964 A | 11/1996 | Hamlin | | 5,903,213 A | 5/1999 | Hodge et al. |
| 5,579,221 A | 11/1996 | Mun | | 5,903,594 A | 5/1999 | Saulnier et al. |
| 5,579,335 A | 11/1996 | Sutterlin et al. | | 5,905,442 A | 5/1999 | Mosebrook et al. |
| 5,581,229 A | 12/1996 | Hunt | | 5,910,776 A | 6/1999 | Black |
| 5,581,801 A | 12/1996 | Spriester et al. | | 5,911,119 A | 6/1999 | Bartholomew et al. |
| 5,590,173 A | 12/1996 | Beasley | | 5,918,016 A | 6/1999 | Brewer et al. |
| 5,592,482 A | 1/1997 | Abraham | | 5,922,047 A | 7/1999 | Newlin et al. |
| 5,596,631 A | 1/1997 | Chen | | 5,926,531 A | 7/1999 | Petite |
| 5,600,333 A | 2/1997 | Justice et al. | | 5,929,748 A | 7/1999 | Odinak |
| 5,603,080 A | 2/1997 | Kallander et al. | | 5,929,749 A | 7/1999 | Slonim et al. |
| 5,613,190 A | 3/1997 | Hylton | | 5,930,682 A | 7/1999 | Schwartz et al. |
| 5,614,811 A | 3/1997 | Sagalovich et al. | | 5,930,719 A | 7/1999 | Babitch et al. |
| 5,619,251 A | 4/1997 | Kuroiwa et al. | | 5,933,073 A | 8/1999 | Shuey |
| 5,619,505 A | 4/1997 | Grube et al. | | 5,936,660 A | 8/1999 | Gurantz |
| 5,628,055 A | 5/1997 | Stein | | 5,937,342 A | 8/1999 | Kline |
| 5,630,204 A | 5/1997 | Hylton et al. | | 5,937,348 A | 8/1999 | Cina et al. |
| 5,634,191 A | 5/1997 | Beasley | | 5,940,400 A | 8/1999 | Eastmond et al. |
| 5,657,358 A | 8/1997 | Panech et al. | | 5,946,616 A | 8/1999 | Schornack et al. |
| 5,684,450 A | 11/1997 | Brown | | 5,949,327 A | 9/1999 | Brown |
| 5,684,826 A | 11/1997 | Ratner | | 5,950,149 A | 9/1999 | Fieramosca et al. |
| 5,689,242 A | 11/1997 | Sims et al. | | 5,952,914 A | 9/1999 | Wynn |
| 5,691,691 A | 11/1997 | Merwin et al. | | 5,953,670 A | 9/1999 | Newson |
| 5,694,108 A | 12/1997 | Shuey | | 5,977,650 A | 11/1999 | Rickard et al. |
| 5,696,861 A | 12/1997 | Schimmeyer et al. | | 5,977,913 A | 11/1999 | Christ |
| 5,699,276 A | 12/1997 | Roos | | 5,982,276 A | 11/1999 | Stewart |
| 5,705,974 A | 1/1998 | Patel et al. | | 5,982,363 A | 11/1999 | Naiff |
| 5,708,701 A | 1/1998 | Houvig et al. | | 5,982,854 A | 11/1999 | Ehreth |
| 5,708,705 A | 1/1998 | Yamashita et al. | | 5,983,070 A | 11/1999 | Georges et al. |
| 5,708,961 A | 1/1998 | Hylton et al. | | 5,983,117 A | 11/1999 | Sandler et al. |
| 5,712,614 A | 1/1998 | Patel et al. | | 5,986,574 A | 11/1999 | Colton |
| 5,717,685 A | 2/1998 | Abraham | | 5,987,303 A | 11/1999 | Dutta et al. |
| 5,722,076 A | 2/1998 | Sakabe et al. | | 5,991,885 A | 11/1999 | Fisher et al. |
| 5,726,980 A | 3/1998 | Rickard | | 5,994,998 A | 11/1999 | Fisher et al. |
| 5,727,004 A | 3/1998 | Propp et al. | | 5,995,593 A | 11/1999 | Cho |
| 5,731,664 A | 3/1998 | Posa | | 6,005,476 A | 12/1999 | Valiulis |
| 5,734,678 A | 3/1998 | Paneth et al. | | 6,005,884 A | 12/1999 | Cook et al. |
| 5,736,965 A | 4/1998 | Mosebrook et al. | | 6,014,386 A | 1/2000 | Abraham |
| 5,748,104 A | 5/1998 | Argyroudis et al. | | 6,018,690 A | 1/2000 | Saito et al. |
| 5,748,671 A | 5/1998 | Sutterlin et al. | | 6,021,158 A | 2/2000 | Schurr et al. |
| 5,754,539 A | 5/1998 | Metz et al. | | 6,026,150 A | 2/2000 | Frank et al. |
| 5,757,936 A | 5/1998 | Lee | | 6,032,057 A | 2/2000 | Kiiski |
| 5,774,526 A | 6/1998 | Propp et al. | | 6,034,988 A | 3/2000 | VanderMey et al. |
| 5,774,789 A | 6/1998 | van der Kaay et al. | | 6,037,678 A | 3/2000 | Rickard |
| 5,777,544 A | 7/1998 | Vander Mey et al. | | 6,040,759 A | 3/2000 | Sanderson |
| 5,777,545 A | 7/1998 | Patel et al. | | 6,055,435 A | 4/2000 | Smith et al. |
| 5,777,769 A | 7/1998 | Coutinho | | 6,069,588 A | 5/2000 | O'Neill, Jr. |
| 5,802,177 A | 9/1998 | Daniel et al. | | 6,084,758 A | 7/2000 | Clarey et al. |
| 5,805,053 A | 9/1998 | Patel et al. | | 6,101,341 A | 8/2000 | Manabe |
| 5,809,431 A | 9/1998 | Bustamante et al. | | 6,104,707 A | 8/2000 | Abraham |
| 5,812,184 A | 9/1998 | Martinez | | 6,107,656 A | 8/2000 | Igarashi |
| 5,815,086 A | 9/1998 | Ivie et al. | | 6,107,912 A | 8/2000 | Bullock et al. |
| 5,818,127 A | 10/1998 | Abraham | | 6,115,429 A | 9/2000 | Huang |

| | | | |
|---|---|---|---|
| 6,127,925 A | 10/2000 | Bonsignore et al. | |
| 6,130,896 A | 10/2000 | Lueker et al. | |
| 6,141,356 A | 10/2000 | Gorman | |
| 6,144,292 A | 11/2000 | Brown | |
| 6,151,330 A | 11/2000 | Liberman | |
| 6,151,480 A | 11/2000 | Fischer et al. | |
| 6,154,488 A | 11/2000 | Hunt | |
| 6,157,292 A | 12/2000 | Piercy et al. | |
| 6,160,795 A | 12/2000 | Hosemann | |
| 6,175,860 B1 | 1/2001 | Gaucher | |
| 6,177,884 B1 | 1/2001 | Hunt et al. | |
| 6,188,557 B1 | 2/2001 | Chaudhry | |
| 6,212,658 B1 | 4/2001 | Le Van Suu | |
| 6,218,931 B1 | 4/2001 | Asghar et al. | |
| 6,229,433 B1 | 5/2001 | Rye et al. | |
| 6,243,413 B1 | 6/2001 | Beukema | |
| 6,243,571 B1 | 6/2001 | Bullock et al. | |
| 6,246,868 B1 | 6/2001 | Bullock et al. | |
| 6,249,213 B1 | 6/2001 | Horne | |
| 6,249,671 B1 | 6/2001 | Tucker et al. | |
| 6,252,755 B1 | 6/2001 | Willer | |
| 6,256,296 B1 | 7/2001 | Ruziak et al. | |
| 6,259,910 B1 | 7/2001 | Fairfield et al. | |
| 6,272,551 B1 | 8/2001 | Martin et al. | |
| 6,275,144 B1 | 8/2001 | Rumbaugh | |
| 6,281,784 B1 | 8/2001 | Redgate et al. | |
| 6,282,405 B1 | 8/2001 | Brown | |
| 6,288,631 B1 | 9/2001 | Shinozaki et al. | |
| 6,288,632 B1 | 9/2001 | Hoctor et al. | |
| 6,290,141 B1 | 9/2001 | Park et al. | |
| 6,300,881 B1 | 10/2001 | Yee et al. | |
| 6,317,884 B1 | 11/2001 | Eames et al. | |
| 6,330,244 B1 | 12/2001 | Swartz et al. | |
| 6,331,814 B1 | 12/2001 | Albano et al. | |
| 6,346,875 B1 | 2/2002 | Puckette et al. | |
| 6,348,875 B1 | 2/2002 | Odinak et al. | |
| 6,353,599 B1 | 3/2002 | Bi et al. | |
| 6,373,377 B1 | 4/2002 | Sacca et al. | |
| 6,377,163 B1 | 4/2002 | Deller et al. | |
| 6,383,076 B1 * | 5/2002 | Tiedeken | 463/40 |
| 6,392,349 B1 | 5/2002 | Crenshaw | |
| 6,396,391 B1 | 5/2002 | Binder | |
| 6,396,392 B1 | 5/2002 | Abraham | |
| 6,396,393 B2 | 5/2002 | Yuasa | |
| 6,397,288 B1 | 5/2002 | Rye et al. | |
| 6,400,815 B1 | 6/2002 | Gilboy et al. | |
| 6,400,957 B1 | 6/2002 | Rodrigues et al. | |
| 6,404,348 B1 * | 6/2002 | Wilfong | 340/657 |
| 6,404,773 B1 | 6/2002 | Williams et al. | |
| 6,407,987 B1 | 6/2002 | Abraham | |
| 6,417,762 B1 | 7/2002 | Comer | |
| 6,438,109 B1 | 8/2002 | Karaoguz et al. | |
| 6,441,723 B1 | 8/2002 | Mansfield, Jr. et al. | |
| 6,442,129 B1 | 8/2002 | Yonge, III et al. | |
| 6,445,087 B1 | 9/2002 | Wang et al. | |
| 6,452,910 B1 | 9/2002 | Vij et al. | |
| 6,452,923 B1 | 9/2002 | Gersszberg et al. | |
| 6,459,692 B1 | 10/2002 | Ben-Michael et al. | |
| 6,483,470 B1 | 11/2002 | Hohnstein et al. | |
| 6,492,897 B1 | 12/2002 | Mowery, Jr. | |
| 6,493,875 B1 | 12/2002 | Eames et al. | |
| 6,496,104 B2 | 12/2002 | Kline | |
| 6,501,942 B1 | 12/2002 | Weissman et al. | |
| 6,513,163 B1 | 1/2003 | Silvia et al. | |
| 6,526,516 B1 | 2/2003 | Ishikawa et al. | |
| 6,526,581 B1 | 2/2003 | Edson | |
| 6,535,110 B1 | 3/2003 | Arora et al. | |
| 6,546,098 B1 | 4/2003 | Henderson | |
| 6,549,120 B1 | 4/2003 | de Buda | |
| 6,549,616 B1 | 4/2003 | Binder | |
| 6,559,757 B1 | 5/2003 | Deller et al. | |
| 6,563,418 B1 | 5/2003 | Moon | |
| 6,573,826 B2 | 6/2003 | Pan | |
| 6,577,231 B2 | 6/2003 | Litwin, Jr. et al. | |
| 6,580,728 B1 | 6/2003 | Cook et al. | |
| 6,583,719 B2 | 6/2003 | Okada et al. | |
| 6,587,479 B1 | 7/2003 | Bianchi et al. | |
| 6,587,739 B1 | 7/2003 | Abrams et al. | |
| 6,600,734 B1 | 7/2003 | Gernert et al. | |
| 6,618,578 B1 | 9/2003 | Petite | |
| 6,622,304 B1 | 9/2003 | Carhart | |
| 6,624,532 B1 | 9/2003 | Davidow et al. | |
| 6,650,871 B1 | 11/2003 | Cannon et al. | |
| 6,653,932 B1 * | 11/2003 | Beamish et al. | 455/3.01 |
| 6,654,616 B1 | 11/2003 | Pope, Jr. et al. | |
| 6,659,947 B1 | 12/2003 | Carter et al. | |
| 6,665,384 B2 | 12/2003 | Daum et al. | |
| 6,668,328 B1 | 12/2003 | Bell | |
| 6,671,501 B1 | 12/2003 | Dalichau | |
| 6,671,519 B2 | 12/2003 | Jeon et al. | |
| 6,683,531 B2 | 1/2004 | Diamanti et al. | |
| 6,686,832 B2 | 2/2004 | Abraham | |
| 6,690,677 B1 | 2/2004 | Binder | |
| 6,704,414 B2 | 3/2004 | Murakoshi | |
| 6,704,545 B1 | 3/2004 | Wala | |
| 6,710,721 B1 | 3/2004 | Holowick | |
| 6,711,417 B1 | 3/2004 | Gorman et al. | |
| 6,714,534 B1 | 3/2004 | Gerszberg et al. | |
| 6,725,059 B1 | 4/2004 | Bell | |
| 6,731,945 B2 | 5/2004 | Do et al. | |
| 6,737,984 B1 | 5/2004 | Welles, II et al. | |
| 6,738,641 B1 | 5/2004 | Elsasser | |
| 6,741,162 B1 | 5/2004 | Sacca et al. | |
| 6,748,080 B2 | 6/2004 | Russ et al. | |
| 6,751,441 B1 | 6/2004 | Murray et al. | |
| 6,759,946 B2 | 7/2004 | Sahinoglu et al. | |
| 6,760,384 B1 | 7/2004 | Garreau et al. | |
| 6,771,164 B1 | 8/2004 | Fink | |
| 6,778,817 B1 | 8/2004 | Bullock et al. | |
| 6,781,530 B2 | 8/2004 | Moore | |
| 6,782,048 B2 | 8/2004 | Santhoff | |
| 6,785,532 B1 | 8/2004 | Rickard | |
| 6,792,323 B2 | 9/2004 | Krzyzanowski et al. | |
| 6,796,555 B1 | 9/2004 | Blahut | |
| 6,807,463 B1 | 10/2004 | Cunningham et al. | |
| 6,822,946 B1 | 11/2004 | Wallace | |
| 6,826,174 B1 | 11/2004 | Erekson et al. | |
| 6,831,921 B2 | 12/2004 | Higgins | |
| 6,842,459 B1 * | 1/2005 | Binder | 370/463 |
| 6,844,809 B2 | 1/2005 | Manis et al. | |
| 6,844,810 B2 | 1/2005 | Cern | |
| 6,850,560 B2 | 2/2005 | Heusala | |
| 6,854,059 B2 | 2/2005 | Gardner | |
| 6,857,132 B2 | 2/2005 | Rakib et al. | |
| 6,885,674 B2 | 4/2005 | Hunt et al. | |
| 6,896,551 B2 | 5/2005 | Hauck et al. | |
| 6,901,439 B1 | 5/2005 | Bonasia et al. | |
| 6,904,134 B2 | 6/2005 | Jeon et al. | |
| 6,922,135 B2 | 7/2005 | Abraham | |
| 6,930,987 B1 | 8/2005 | Fukuda et al. | |
| 6,931,659 B1 | 8/2005 | Kinemura | |
| 6,933,835 B2 | 8/2005 | Kline | |
| 6,934,170 B2 | 8/2005 | Ooishi | |
| 6,941,576 B2 | 9/2005 | Amit | |
| 6,947,409 B2 | 9/2005 | Iwamura | |
| 6,947,736 B2 | 9/2005 | Shaver et al. | |
| 6,950,567 B2 | 9/2005 | Kline | |
| 6,956,826 B1 | 10/2005 | Binder | |
| 6,958,680 B2 | 10/2005 | Kline | |
| 6,961,763 B1 | 11/2005 | Wang et al. | |
| 6,963,936 B2 | 11/2005 | Billington et al. | |
| 6,965,302 B2 | 11/2005 | Mollenkopf et al. | |
| 6,965,303 B2 | 11/2005 | Mollenkopf | |
| 6,972,688 B2 | 12/2005 | Rapaich | |
| 6,975,211 B2 | 12/2005 | Atsuta et al. | |
| 6,977,578 B2 | 12/2005 | Kline | |

| | | |
|---|---|---|
| 6,980,089 B1 | 12/2005 | Kline |
| 6,980,090 B2 | 12/2005 | Mollenkopf |
| 6,980,091 B2 | 12/2005 | White, II et al. |
| 6,982,611 B2 | 1/2006 | Cope |
| 6,985,072 B2 | 1/2006 | Omidi et al. |
| 6,985,714 B2 | 1/2006 | Akiyama et al. |
| 6,987,430 B2 | 1/2006 | Wasaki et al. |
| 6,989,734 B2 | 1/2006 | Thomas |
| 6,993,317 B2 | 1/2006 | Belsak, Jr. |
| 6,995,657 B2 | 2/2006 | Zalitzky et al. |
| 6,995,658 B2 | 2/2006 | Tustison et al. |
| 6,996,837 B1 | 2/2006 | Miura et al. |
| 6,998,962 B2 | 2/2006 | Cope et al. |
| 6,998,964 B2 | 2/2006 | Lomax, Jr. et al. |
| 6,999,505 B2 | 2/2006 | Yokoo et al. |
| 7,003,102 B2 | 2/2006 | Kiko |
| 7,006,006 B2 | 2/2006 | Witkow et al. |
| 7,007,305 B2 | 2/2006 | Carson et al. |
| 7,009,527 B2 | 3/2006 | Seo |
| 7,009,946 B1 | 3/2006 | Kardach |
| 7,015,797 B2 | 3/2006 | Kaylor et al. |
| 7,026,917 B2 | 4/2006 | Berkman |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,035,281 B1 | 4/2006 | Spearman et al. |
| 7,046,124 B2 | 5/2006 | Cope et al. |
| 7,046,882 B2 | 5/2006 | Kline |
| 7,049,939 B2 | 5/2006 | Ikeda et al. |
| 7,053,756 B2 | 5/2006 | Mollenkopf et al. |
| 7,064,654 B2 | 6/2006 | Berkman et al. |
| 7,072,408 B2 | 7/2006 | Gehlot et al. |
| 7,079,012 B2 | 7/2006 | Wetmore |
| 7,082,320 B2 | 7/2006 | Kattukaran et al. |
| 7,088,238 B2 | 8/2006 | Karaoguz et al. |
| 7,091,849 B1 | 8/2006 | Henry |
| 7,098,773 B2 | 8/2006 | Berkman |
| 7,099,368 B2 | 8/2006 | Santhoff et al. |
| 7,099,621 B1 | 8/2006 | Chadwick |
| 7,103,240 B2 | 9/2006 | Kline |
| 7,106,261 B2 | 9/2006 | Nagel et al. |
| 7,106,721 B1 | 9/2006 | Binder |
| 7,113,134 B1 | 9/2006 | Berkman |
| 7,113,763 B2 | 9/2006 | Heinonen et al. |
| 7,117,520 B2 | 10/2006 | Stewart |
| 7,133,278 B2 | 11/2006 | Amdahl et al. |
| 7,133,729 B1 | 11/2006 | Wang et al. |
| 7,135,982 B2 | 11/2006 | Lee |
| 7,136,270 B2 | 11/2006 | Liebenow |
| 7,136,936 B2 | 11/2006 | Chan et al. |
| 7,142,094 B1 | 11/2006 | Davidow |
| 7,142,560 B2 | 11/2006 | Mansfield |
| 7,143,299 B1 | 11/2006 | Rubinstein et al. |
| 7,148,799 B2 | 12/2006 | Cern et al. |
| 7,149,474 B1 | 12/2006 | Mikhak |
| 7,151,575 B1 | 12/2006 | Landry et al. |
| 7,155,214 B2 | 12/2006 | Struthers et al. |
| 7,162,377 B2 | 1/2007 | Amrod et al. |
| 7,164,346 B2 | 1/2007 | Hunt et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,170,405 B2 | 1/2007 | Daum et al. |
| 7,171,506 B2 | 1/2007 | Iwamura |
| 7,176,786 B2 | 2/2007 | Kline et al. |
| 7,180,412 B2 | 2/2007 | Bonicatto et al. |
| 7,181,023 B1 | 2/2007 | Andrews et al. |
| 7,183,902 B2 | 2/2007 | Hamburgen et al. |
| 7,187,946 B2 | 3/2007 | Palan |
| 7,194,251 B2 | 3/2007 | Rubinstein et al. |
| 7,194,528 B1 | 3/2007 | Davidow |
| 7,198,521 B2 | 4/2007 | Hauck et al. |
| 7,199,699 B1 | 4/2007 | Gidge |
| 7,199,706 B2 | 4/2007 | Dawson et al. |
| 7,206,417 B2 | 4/2007 | Nathan |
| 7,209,719 B2 | 4/2007 | Liebenow |
| 7,209,945 B2 | 4/2007 | Hicks, III et al. |
| 7,224,272 B2 | 5/2007 | White, II et al. |
| 7,242,729 B1 | 7/2007 | Heistermann et al. |
| 7,245,625 B2 | 7/2007 | Manis et al. |
| 7,247,793 B2 | 7/2007 | Hinkson et al. |
| 7,257,106 B2 | 8/2007 | Chen et al. |
| 7,257,108 B2 | 8/2007 | Cheston et al. |
| 7,265,664 B2 | 9/2007 | Berkman |
| 7,266,344 B2 | 9/2007 | Rodriguez |
| 7,276,915 B1 | 10/2007 | Euler et al. |
| 7,292,859 B2 | 11/2007 | Park |
| 7,299,287 B1 | 11/2007 | Rubinstein et al. |
| 7,307,510 B2 | 12/2007 | Berkman |
| 7,310,355 B1 | 12/2007 | Krein et al. |
| 7,319,717 B2 | 1/2008 | Zitting |
| 7,322,860 B2 | 1/2008 | Martich et al. |
| 7,323,968 B2 | 1/2008 | Wamura |
| 7,324,488 B1 | 1/2008 | Rubinstein et al. |
| 7,324,824 B2 | 1/2008 | Smith et al. |
| 7,330,695 B2 | 2/2008 | Karschnia et al. |
| 7,331,819 B2 | 2/2008 | Nelson et al. |
| 7,339,458 B2 | 3/2008 | Cern |
| 7,340,509 B2 | 3/2008 | Daum et al. |
| 7,345,998 B2 | 3/2008 | Cregg et al. |
| 7,346,918 B2 | 3/2008 | Hennenhoefer et al. |
| 7,349,325 B2 | 3/2008 | Trzeciak et al. |
| 7,359,392 B2 | 4/2008 | Bianchi et al. |
| 7,362,285 B2 | 4/2008 | Webb et al. |
| 7,375,445 B1 | 5/2008 | Smith |
| 7,401,239 B2 | 7/2008 | Chan et al. |
| 7,406,094 B2 | 7/2008 | Propp et al. |
| 7,406,536 B2 | 7/2008 | Efrati et al. |
| 7,408,949 B2 | 8/2008 | Baum |
| 7,413,471 B2 | 8/2008 | Chan |
| 7,486,648 B1 * | 2/2009 | Baranowski ................ 370/338 |
| 2002/0011923 A1 | 1/2002 | Cunningham et al. |
| 2002/0024424 A1 | 2/2002 | Burns et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0049036 A1 | 4/2002 | Bullock et al. |
| 2002/0056116 A1 | 5/2002 | Smith |
| 2002/0075806 A1 | 6/2002 | Shalvi et al. |
| 2002/0080010 A1 | 6/2002 | Zhang |
| 2002/0095662 A1 | 7/2002 | Ashlock et al. |
| 2002/0128009 A1 | 9/2002 | Boch et al. |
| 2002/0145509 A1 | 10/2002 | Karny et al. |
| 2002/0159512 A1 | 10/2002 | Matsumoto |
| 2003/0006881 A1 | 1/2003 | Reyes |
| 2003/0018975 A1 | 1/2003 | Stone |
| 2003/0024728 A1 | 2/2003 | Yamamoto et al. |
| 2003/0046377 A1 | 3/2003 | Daum et al. |
| 2003/0067910 A1 | 4/2003 | Razazian et al. |
| 2003/0088706 A1 | 5/2003 | Chan et al. |
| 2003/0090368 A1 | 5/2003 | Ide et al. |
| 2003/0100288 A1 | 5/2003 | Tomlinson, Jr. et al. |
| 2003/0100330 A1 | 5/2003 | Tomlinson et al. |
| 2003/0103521 A1 | 6/2003 | Raphaeli et al. |
| 2003/0106067 A1 | 6/2003 | Hoskins et al. |
| 2003/0133473 A1 | 7/2003 | Manis et al. |
| 2003/0224728 A1 | 12/2003 | Heinonen et al. |
| 2004/0006484 A1 | 1/2004 | Manis et al. |
| 2004/0032373 A1 | 2/2004 | Petros et al. |
| 2004/0037317 A1 | 2/2004 | Zalitzky et al. |
| 2004/0073597 A1 | 4/2004 | Caveney et al. |
| 2004/0077310 A1 | 4/2004 | Levy |
| 2004/0083262 A1 | 4/2004 | Trantow |

| | | |
|---|---|---|
| 2004/0085976 A1 | 5/2004 | Dale et al. |
| 2004/0105539 A1 | 6/2004 | Auzizeau et al. |
| 2004/0107299 A1 | 6/2004 | Lee et al. |
| 2004/0123322 A1 | 6/2004 | Erkocevic et al. |
| 2004/0125870 A1 | 7/2004 | Yamazaki |
| 2004/0130413 A1 | 7/2004 | Mentz et al. |
| 2004/0136388 A1 | 7/2004 | Schaff |
| 2004/0156513 A1 | 8/2004 | Kaylor et al. |
| 2004/0158649 A1 | 8/2004 | Ophir et al. |
| 2004/0162117 A1 | 8/2004 | Liebenow |
| 2004/0177167 A1 | 9/2004 | Iwamura et al. |
| 2004/0178888 A1 | 9/2004 | Hales et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0203387 A1 | 10/2004 | Grannan |
| 2004/0208167 A1 | 10/2004 | Kishida |
| 2004/0208599 A1 | 10/2004 | Swartz et al. |
| 2004/0235468 A1 | 11/2004 | Luebke et al. |
| 2004/0250273 A1 | 12/2004 | Swix et al. |
| 2004/0255332 A1 | 12/2004 | Bertonis et al. |
| 2004/0259538 A1 | 12/2004 | Agbegnenou |
| 2005/0015805 A1 | 1/2005 | Iwamura |
| 2005/0018648 A1 | 1/2005 | Scheelke |
| 2005/0018766 A1 | 1/2005 | Iwamura |
| 2005/0018857 A1 | 1/2005 | McCarty et al. |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0136972 A1 | 6/2005 | Smith et al. |
| 2005/0144647 A1 | 6/2005 | Zussman et al. |
| 2005/0152337 A1 | 7/2005 | Wurtzel et al. |
| 2005/0164666 A1 | 7/2005 | Lang et al. |
| 2005/0181839 A1 | 8/2005 | Tiainen et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0268322 A1 | 12/2005 | Watson |
| 2005/0280598 A1 | 12/2005 | Webb et al. |
| 2006/0007945 A1 | 1/2006 | Schoettle et al. |
| 2006/0017324 A1 | 1/2006 | Pace et al. |
| 2006/0018328 A1 | 1/2006 | Mody et al. |
| 2006/0133465 A1 | 6/2006 | Dockemeyer, Jr. et al. |
| 2006/0140260 A1 | 6/2006 | Wasaki et al. |
| 2006/0152344 A1 | 7/2006 | Mowery, Jr. |
| 2006/0172781 A1 | 8/2006 | Mohebbi |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0235333 A1 | 10/2006 | Couvillon, Jr. |
| 2006/0238250 A1 | 10/2006 | Camagna et al. |
| 2006/0251086 A1 | 11/2006 | Ha et al. |
| 2006/0251179 A1 | 11/2006 | Ghoshal |
| 2006/0274745 A1 | 12/2006 | Wang et al. |
| 2006/0280197 A1 | 12/2006 | Stone |
| 2006/0286958 A1 | 12/2006 | Lee et al. |
| 2007/0002772 A1 | 1/2007 | Berkman et al. |
| 2007/0002876 A1 | 1/2007 | Berkman et al. |
| 2007/0019959 A1 | 1/2007 | Retnasothie et al. |
| 2007/0025368 A1 | 2/2007 | Ha et al. |
| 2007/0036171 A1 | 2/2007 | Magin |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0213879 A1 | 9/2007 | Iwamura |
| 2007/0254714 A1 | 11/2007 | Martich et al. |
| 2007/0268886 A1 | 11/2007 | Caspi et al. |
| 2008/0013612 A1 | 1/2008 | Miller et al. |
| 2008/0013637 A1 | 1/2008 | Kodama et al. |
| 2008/0025723 A1 | 1/2008 | Mayer et al. |
| 2008/0062013 A1 | 3/2008 | Face et al. |
| 2008/0125187 A1 | 5/2008 | Chang et al. |
| 2008/0136915 A1 | 6/2008 | Iwamura |
| 2008/0140565 A1 | 6/2008 | DeBenedetti et al. |
| 2008/0153415 A1 | 6/2008 | Block et al. |
| 2008/0165463 A1 | 7/2008 | Chan |
| 2008/0186150 A1 | 8/2008 | Kao |

FOREIGN PATENT DOCUMENTS

| | | |
|---|---|---|
| EP | 0 798 923 B1 | 9/2000 |
| KR | 199822718 | 7/1998 |
| KR | 1020000000152 A | 1/2000 |
| WO | 9623377 A1 | 8/1996 |
| WO | WO 99/25098 | 5/1999 |
| WO | WO 99/25098 A1 | 5/1999 |
| WO | WO 2004/068827 | 8/2004 |
| WO | WO 2004/068827 A1 | 8/2004 |
| WO | WO 2005/022692 | 3/2005 |
| WO | WO 2005/022692 A2 | 3/2005 |
| WO | WO2007069241 A2 | 6/2007 |

OTHER PUBLICATIONS

EIA-600.31—Power Line Physical Layer & Medium Specification, undated (24 pages).
EIA-600.37 Symbol Encoding Sublayer; Revision: May 12, 1995 (30 pages).
EIA-600.38 Power Line / RF Symbol Encoding Sublayer; Revision May 12, 1995 (64 pages).
Draft IS-60.04 Node Communications Protocol Part 6: Application Layer Specification; Revision Apr. 18, 1996 (129 pages).
EIA 600.42 Node Medium Access Control Sublayer; Revision IS-60 Feb. 22, 1996 (54 pages).
EIA 600.41 Description of the Data Link Layer; Revision IS-60 Jan. 31, 1996 (60 pages).
Home Automation Buses: Protocols Really Hit Home; EDN Apr. 13, 1995 (9 pages).
Powerhouse Wireless Remote Controls; date unknown (3 pages).
Powerhouse Wireless Wall Switches; date unknown (3 pages).
EIA-600.10 Introduction to the CEBus Standard; Revision Feb. 5, 1995 (19 pages).
Compaq to Ride The CEBus; by Mark Hachman, EBN Jan. 22, 1996 (1 page).
Banish Those "Wall-Warts" With Power Over Ethernet; by Jacob Herbold and Dave Dwelley, Electronic Design Oct. 27, 2003 (8 pages).
Echelon Customer Support Alert Re: RTR-10 Core Module and RTR-10 Motherboard Changes; Jan. 1996 (2 pages).
CEBus Router Testing; IEEE Transactions on Consumer Electronics Nov. 1991, vol. 37 No. 4 (8 pages).
LAN Operates Over Existing Power Lines; by David J. Bak, Design News Jan. 23, 1989 (3 pages).
A Power LAN for Telecommunication Power Supply Equipment; Proceedings TENCON '93 1993 IEEE Region 10 Conference on "Computer, Communication, Control and Power Engineering", pp. 24-27, vol. 3 of 5, Oct. 19-21, 1993 (6 pages).

A Distributed Experimental Communications System; IEEE Journal on Selected Areas in Communications, vol. Sac-1, No, 6 pp. 1070-1075, Dec. 1983 (6 pages).
Fieldbus Standard for Use in Industrial Control Systems, Part 2: Physical Layer Specification and Service Definition; ANSI/ISA-S50.02-1992, Approved May 17, 1994 (106 pages).
AN192 Powerline Network Communications Module; Adaptive Networks Printed Nov. 1988 (2 pages).
Spread Spectrum Carrier Technology Enabling Reliable Communications Over Noisy Media; Intellon, date unknown (8 pages).
NE5050 Power Line Modem Product Specification; Philips Semiconductors, Apr. 15, 1992 (6 pages).
RCA Wireless Phone Jack for DirecTV from Amazon Web-site (5 pages).
Power Line Modems and Networks; by R. Broadbridge Second IEE National Conference on Telecommunications Apr. 2-5, 1989 pp. 294-296 (6 pages).
Now This is Plug and Play; Business Week Updated Jun. 14, 1997 (2 pages).
Cheap, Reliable Powerful 'Net Connections may be as Close as an Electrical Socket; by Bob Metcalfe InfoWorld Feb. 10, 1997 vol. 19 Issue 6 (4 pages).
Communications System Uses Standard Powerlines; Computer Design Nov. 1995 (3 pages).
Telecommunication Over the Power Distribution Grid—Possibilities and Limitations; by Klaus M. Dostert, Proceedings 1997 International Symposium on Power-Line Communications and Its Applications, Apr. 2-4, 1997 (10 pages).
Intelogis Simplifies Networking. (Passport Plug-In Network); Jul. 20, 1998 (1 page).
Chip Set Puts 100 Kbit/s of Data on Noisy Power Lines; Electronic Design Mar. 18, 1996 (9 pages).
Socket to Me: Networks Linked by Electrical Lines; Mass High Tech Jan. 20-26, 1997 (1 page).
Spread-Spectrum Data Leap Through AC Power Wiring; IEEE Spectrum Nov. 1996 (5 pages).
The Use of Reliable Communications in Telemanagement Trials; by Dr. Michael Propp, Proceedings 1997 International Symposium on Power-Line Communications and Its Applications, 2nd Edition, Apr. 2-4, 1997 (9 pages).
A Novel High-Speed PLC Communication Modem; IEEE Transaction on Power Delivery, vol. 7 No. 4 Oct. 1992 (8 pages).
AN192 Product Specifications; Adaptive Networks (2 pages).
Data Transmission Without Wires; Material Handling Engineering 1993 (1 page).
High Cost of Wiring Sparks Wireless LAN Alternatives; Computer Technology Review vol. XIV No. 3, Mar. 1994 (8 pages).
Cable, Television, and The Consumer Electronic Bus; by J. Hofmann, date unknown (9 pages).
Videohub Cuts Costs, Opens Options; Data Communications Feb. 1992 (4 pages).
LAN Operates Over Existing Power Lines; by David J. Bak, East Coast editor (2 pages).
LTS-10 SLTA Core Module Model 65200; Echelon 1993 (12 pages).
A Power LAN for Telecommunication Power Supply Equipment; IEEE TENCON '93 (4 pages).
A Token Passing Network for Powerline Communications; by Adaptive networks, IEEE Transactions on Consumer Electronics vol. 37 No. 2, May 1991 (6 pages).
Carrier Current Audio Transmitter; Radio-Electronics, Jan. 1989 (5 pages).
Carrier Current Receiver; Radio-Electronics, Feb. 1989 (vol. 60 No. 2) (6 pages).
Spread Spectrum Carrier Technology—Enabling Reliable Communications Over Noisy Media; Intellon Corporation (8 pages).
Line Carrier Modems—1: Build a Pair of Line-Carrier Modems (Part 1); Radio Electronics, Jul. 1988, pp. 87-91 by Keith Nichols (7 pages).
Line Carrier Modems—2: Build a Pair of Line-Carrier Modems (Part 2); Radio Electronics, Aug. 1988, pp. 88-96 by Keith Nichols (5 pages).
Sheets and Graf, "Build This Carrier Current Audio Transmitter", Radio Electronics, pp. 55-64, 1989.

Sheets and Graf, "Build This Carrier Current Receiver", Radio Electronics, pp. 54-94, 1989.
M. Inoue, et al., "The MELON Home Automation Housekeeping System", Mitsubishi Denki Giho, vol. 63, No. 2, 1989, pp. 36-41.
C. Dougligeris, et al., "Comunications and Control For A Home Auomation System", Conference: IEEE Proceedings of the Southeastcon 1991, vol. 1, pp. 171-175.
D.G.J. Fanshawe, "Architures for Home Systems," Conference: IEEE Colloquium on Home Systems—Information, Entertainment and Control, Oct. 1, 1990, London, United Kingdom, pp. 3/1-3/3.
"CEBus: US Households Are Being Networked," Funkschau, No. 9, Apr. 1989, pp. 45-47.
Hoe-Young Noh, "Home Automation," Korea Information Science Society Review, Apr. 1989, vol. 7 No. 2, pp. 40-44, Republic of Korea.
"White Paper on Medium Voltage Powerline Communication (PLC) Networks", CIGRE SC D2 WG 14, Broadband PLC, (Mar. 2005), pp. 1-58.
"White Paper on Medium Voltage Powerline Communication (PLC) Networks Annexes", CIGRE SC D2 WG 14, Broadband PLC, (Apr. 2005), 1-15.
Patent Abstracts of Japan, Japanese Publication No. 10200544 A2, Published Jul. 31, 1998, (Matsushita Electric Works, Ltd).
Tohoku Electric Power, Co., Inc., "Tohoku Electric Develops High-Speed Communications System Using Power Distribution Lines," Tohoku Currents, Spring 1998, 8(1), 2 pages (http://www.tohoku-epco.co.jp/profil/kurozu/c.sub.—vol. 8.sub.—1/art04.ht- m).
Power Line Communications Conference Entitled, "PLC, A New Competitor in Broadband Internet Access," Dec. 11-12, 2001, Washington, D.C., 60 pages.
Rivkin, S. R., "Co-Evolution of Electric & Telecommunications Networks", The Electricity Journal, May 1998, pp. 71-76.
Marketing Assessment Presentation Entitled "Powerline Telecommunications", The Shpigler Group for CITI PLT, Jul. 16, 2002, 9 pages.
C. Campbell, Presentation Entitled "Building a Business Case for PLC: Lessons Learned From the Communication Industry Trenches", KPMG Consulting, Jul. 16, 2002, 5 pages.
"Embedded Power Line Carrier Modem," Archnet Electronic Technology, http://www.archnetco.com/english/product/ATL90.htm, .Copyrgt. 2001, 3 pages.
"Archnet: Automatic Meter Reading System Power Line Carrier Communication", www.archnetco.com/english/product/ product.sub.—sl.htm, .Copyrgt. 2001, 3 pages.
"Power Line Communications Solutions", www.echelon.com/products/oem/transceivers/powerline/default.htm, . Copyrgt. 2002, 2 pages.
"Texas Instruments: System Block Diagrams; Power Line Communication (Generic)", http://focus.ti.com/docs/apps/catalog/resources/blockdiagram.jhtml?bdId=6- 38, Copyrgt. 1995-2002. 1 page.
N.A. Feduschak, "Waiting in the Wings: Is Powerline Technology Ready to Compete with Cable?", Mar. 2001, www.cabletoday.com/ic2/archives/0301/0301powerline.htm, 5 pages.
"Signalling on Low-Voltage Electrical Installations in the Frequency Band 3kHz to 148.5kHz-Part 4: Filters at the Interface of the Indoor and Outdoor Electricity Network", CLC SC 105A (Secretariat) May 1992, 62, pp. 1-11.
"Intellon Corporation Test Summary for Transformerless Coupler Study", Intellon No News Wires, Dec. 24, 1998, DOT/NHTSA Order No. DTNH22-98-P-07632, pp. 1-18.
Emetcon Automated Distribution System, ABB Power T & D Company, Inc., Jan. 1990, Raleigh, North Carolina, No. B-919A, 14 pages.
"Dedicated Passive Backbone for Power Line Communications", IBM Technical Disclosure Bulletin, Jul. 1997, 40 (7), pp. 183-185.
"Centralized Commercial Building Applications with the Lonworks .RTM. PLT-21 Power Line Transceiver", Lonworks Engineering Bulletin, Echelon, Apr. 1997, pp. 1-22.
Plexeon Logistics, Inc., "Power Line Communications", www.plexeon.com/power.html, .Copyrgt. 1998-2003, 2 pages.

"Emetcon Automated Distribution System: Communications Guide", Westinghouse ABB Power T & D Company Technical Manual 42-6001A, Sep. 1989, 55 pages.

K.C. Abraham, et al., "A Novel High-Speed PLC Communication Modem", IEEE Transactions on Power Delivery, 1992, 7(4), pp. 1760-1768.

J.M. Barstow, "A Carrier Telephone System for Rural Service", AIEE Transactions, 1947, 66, 301-307.

S.S.L. Chang, "Power-Line Carrier", Fundamentals Handbook of Electrical and Computer Engineering, vol. II—Communication, Control, Devices and Systems, John Wiley & Sons, New York, 1983, pp. 617-627.

Y.F. Chen, et al. "Baseband Transceiver Design of a 128-Kbps Power-Line Modem for Household Applications", IEEE Transactions on Power Delivery, 2002, 17 (2), pp. 338-344.

N.G. Coakley, et al., "Real-Time Control of a Servosystem Using the Inverter-Fed Power Lines to Communicate Sensor Feedback", IEEE Transactions on Industrial Electronics, 1999, 46 (2), 360-369.

T. Esmailian, et al., "A Discrete Multitone Power Line Communication System", Department of Electrical and Computer Engineering, University of Toronto, Ontario Canada, 2000 IEEE, pp. 2953-2956.

Kawamura, A. et al., "Autonomous Decentralized Manufacturing System Using High-speed Network with Inductive Transmission of Data and Power", IEEE, 1996, pp. 940-945.

Kilbourne, B. "EEI Electric Perspectives: The Final Connection", www.eei.org/ep/editorial/Jul-01/0701conenct.htm, Jul./Aug. 2001, 7 pages.

W.O. Kim, et al., "A Control Network Architecture Based on EIA-709.1 Protocol for Power Line Data Communications", IEEE Transactions on Consumer Electronics, 2002, 48 (3), pp. 650-655.

C.K. Lim, et al., "Development of a Test Bed for High-Speed Power Line Communications", School of Electrical and Electronic Engineering, Nanyang Technological University, Singapore, IEEE, 2000, pp. 451-456.

G. Lokken, et al., "The Proposed Wisconsin Electric Power Company Load Management System Using Power Line Carrier Over Distribution Lines", 1976 National Telecommunications Conference, IEEE, 1976, 2.2-12.2-3.

E. Marthe, et al., "Indoor Radiated Emission Associated with Power Line Communication Systems", Swiss Federal Institute of Technology Power Systems Laboratory IEEE, 2001, pp. 517-520.

Naredo, J.L. et al., "Design of Power Line Carrier Systems on Multitransposed Delta Transmission Lines", IEEE Transactions on Power Delivery, 1991, 6 (3), pp. 952-958.

H. Okazaki, et al., "A Transmitting, and Receiving Method for CDMA Communications Over Indoor Electrical Power Lines", IEEE, 1998, pp. VI-522-VI-528.

B. Don Russell, "Communication Alternatives for Distribution Metering and Load Management", IEEE Transactions on Power Apparatus and Systems, 1980, vol. PAS-99 (4), pp. 1448-1455.

W.N. Sado, et al., "Personal Communication on Residential Power Lines-Assessment of Channel Parameters", Nov. 6-10, 1995, IEEE, pp. 532-537.

Lonworks Engineering Bulletin, "Demand Side Management with Lonworks.RTM. Power Line Transceivers", Dec. 1996, 36 pages.

HomePlug.TM.Powerline Alliance, HomePlug Initial Draft Medium Interface Specification, May 19, 2000, 109 pages.

HomePlug.TM.Powerline Alliance, HomePlug 0.5 Draft Medium Interface Specification, Nov. 28, 2000, 133 pages.

HomePlug.TM.Powerline Alliance, HomePlug Initial Draft Medium Interface Specification, Jul. 27, 2000, 109 pages.

HomePlug.TM.Powerline Alliance, HomePlug 1.01 Specification, Dec. 1, 2001, 139 pages.

Summary of an IEEE Guide for Power-Line Carrier Applications, A Report by the Power System Communications Committee, IEEE Transactions on Power Apparatus and Systems, vol. PAS-99, No. 6, Nov./Dec. 1980, pp. 2334-2337.

Communication Link on the LV Power Supplies for Utility Services: Field Tests in Belgium, Apr. 3-5, 1990, Sixth International Conference on , Manchester, UK. pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

E.F. Hasler, et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, .Copyrgt. 1980 by The Institute of Electrical and Electronics Engineers, Inc., pp. 1-80.

M. Hatori, et al., "Home Informatization and Standardization of Home Bus," IEEE Transactions on Consumer Electronics, Aug. 1986, vol. CE-32, No. 3, pp. 542-549.

J. M. Hunt, et al., "Electrical Energy Monitoring and Control System for the Home," IEEE Transactions on Consumer Electronics, Aug. 1986, vol. CE-32, No. 3, pp. 578-583.

F.W. Gutzvviller, et al., "Homenet: a Control Network for Consumer Applications," IEEE Transactions on Consumer Electronics, Aug. 1983, vol. CE-29, No. 3, pp. 297-304.

P. Burrascano, et al., "Digital Signal Transmission on Power Line Carrier Channels: An Introduction," IEEE Transactions on Power Delivery, Jan. 1987, vol. PWRD-2, No. 1, pp. 50-56.

Burr, A.G. Burr, et al., "Effect of HF Broadcast Interference on PowerLine Telecommunications Above 1 MHZ". Copyrgt.1998 IEEE, pp. 2870-2875.

J. Onunga, et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321-326.

H. Meng et al., "A Transmission Line Model for High-Frequency Power Line Communication Channel,". Copyrgt.2002 IEEE, pp. 1290-1295.

P. Burrascano, et al., "Performance Evaluation of Digital Signal Transmission Channels on Coronating Power Lines," .Copyrgt.1988 IEEE, pp. 365-368.

D.A. Diclementi, et al., "Electrical Distribution System Power Line Characterization," .Copyrgt.1996 IEEE, pp. 271-276.

M. Yoshitoshi et al., "Proposed Interface Specifications for Home Bus," IEEE Transactions on Consumer Electronics, Aug. 1986, vol. CE-32, No. 3, pp. 550-557.

J.B. Oneal, Jr., "The Residential Power Circuit as a Communication Medium," IEEE Transactions on Consumer Electronics, Aug. 1986, vol. CE-32, No. 3, pp. 567-577.

K. Dostert, "EMC Aspects of High Speed Powerline Communications," Proceedings of the 15.sup.th International Wroclaw Symposium and Exhibition on Electromagnetic Capability, Jun. 27-30, 2000; Wroclaw, Poland, pp. 98-102.

R.A. Piety, "Intrabuilding Data Transmission Using Power-Line Wiring," Hewlett-Packard Journal, May 1987, pp. 35-40.

K. Dostert, Powerline Communications, Ch. 5, pp. 286, 288-292, Prentice Hall PTR, Upper Saddle River, NJ . Copyrgt.2001.

E. Liu, et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

LowWorks LPI-10 Link Power Interface Module User's Guide; Echelon Corporation, 1995 (37 pages).

LonWorks LPT-10 Link Power Transceiver User's Guide Version 2.1; Echelon Corporation, 1995 (60 pages).

LonWorks Router User's Guide Revision 3; Echelon Corporation, 1995 (68 pages).

Using the LonWorks PLT-22 Power Line Transceiver in European Utility Application, Version 1; Echelon Corporation, 1996-1999 (118 pages).

PL3120 / PL3150 Power Line Smart Transceiver Data Book, Version 2; Echelon Corporation, 1996-2005 (251 pages).

PL DSK 2.1 Power Line Smart Transceiver Development Support Kit User's Guide; Echelon Corporation, 2005-2006 (18 pages).

Introduction to Pyxos FT Platform; Echelon Corporation, 2007 (34 pages).

LTM-10A User's Guide, Revision 4; Echelon Corporation, 1995-2001 (46 pages).

LonWorks Twisted Pair Control Module, User's Guide Version 2; Echelon Corporation, 1992-1996 (50 pages).
AN1000EVK Evaluation Unit Manual, Draft 1.0; Adaptive Networks Inc., Document No. 04-3170-04-B Aug. 1996 (31 pages).
AN1000 Powerline Network Communications Chip Set, Adaptive Networks Inc., 1995 (56 pages).
From the Ether—Bob Metcalfe, 'Cheap, reliable, powerful 'net connections may be as close as an electrical socket'; by Bob Metcalfe InfoWorld Feb. 10, 1997 vol. 19 Issue 6 (4 pages).
LonWorks Custom Node Development, LonWorks Engineering Bulletin; Echelon Corporation, Jan. 1995 (16 pages).
Building a LonTalk-to-PLC Gateway, LonWorks Engineering Bulletin; Echelon Corporation, May 1994 (62 pages).
LonWorks 78kbps Self-Healing Ring Architecture, LonWorks Marketing Bulletin; Echelon Corporation, Aug. 1993 (6 pages).
Centralized Commercial Building Applications with the LonWorks PLT-21 Power Line Transceiver, LonWorks Engineering Bulletin; Echelon Corporation, Apr. 1997 (22 pages).
LonWorks for Audio Computer Control Network Applications; Echelon Corporation, Jan. 1995 (30 pages).
Demand Side Management with LonWorks Power Line Transceivers, LonWorks Engineering Bulletin; Echelon Corporation, Dec. 1996 (36 pages).
Intelogis to Present on Stage at Internet Showcase 1998; PR Newswire Jan. 28, 1998 (1 page).
PassPort PC Plug in Quick Setup Guide; Intelogis P/N 30030202, date unknown (8 pages).
The CeBus Standard User's Guide, May 1996, pp. 1-317.
Dastangoo, S. et al., "Wireless LAN Technologies and Applications", Milcom 1993, Conference Record, IEEE, vol. 2, pp. 497-501.
Kelly, J.C. et al., "Power Line Based LAN Applications in Residential Communication and Control", Wireless LAN Implementation, IEEE Conference on Sep. 17-18, 1992, pp. 38-41.
Newbury, J. et al., "Potential Communication Services Using Power Line Carriers and Broadband Integrated Services Digital Network", IEEE Transactions on Oct. 1999, vol. 14, pp. 1197-1201.
Okazaki, H. et al., "A Transmitting and Receiving Method for CDMA Communications Over Indoor Electrical Power Lines", International Symposium on May 31, 1998-Jun. 3, 1998, vol. 6, pp. 522-528.
Pahlavan, K. et al., "Trends in Local Wireless Networks", Communications Magazine, IEEE, Issue 3, Mar. 1995, vol. 33, pp. 88-95.
Sado, W.N. et al., "Personal Communication on Residential Power Lines—Assessment of Channel Parameters", Fourth IEEE International Conference on Nov. 6-10, 1995, pp. 532-537.
Yi-Fu, Chen et al., "A 100-kbps Power-Line Modem for Household Applications", International Symposium on Jun. 8-10, 1999, pp. 179-182.
Yi-Fu, Chen et al., "Baseband Transceiver Design of a 128-kbps Power-Line Modem for Household Applications", IEEE Transactions, Issue 2, Apr. 2002, vol. 17, pp. 338-344.
Zeino, H. et al., "Functional Approach to a Hybrid Wireless Network fro Mobile Stations", Personal, Indoor and Mobile Radio Communications, Fifth IEEE International Symposium on Sep. 18-23, 1994, vol. 3, pp. 994-998.
Abraham, K.C. et al; A Novel High-Speed PLC Communication Modem; IEEE Transaction on Power Delivery, vol. 7, No. 4, Oct. 1992, 8 pages.
Abraham, Richard, "Socket to me: networks linked by electrical lines"; Mass High Tech, 1997, one page.
Bak, David; "LAN Operates Over Existing Power Lines"; Design News, Jan. 23, 1989, 3 pages.
Broadbridge, R.; "Power Line Modems and Networks"; Second IEE National Conference on Telecommunications, Apr. 2-5, 1989; pp. 294-296, 6 pages.
Detreville, John et al; "A Distributed Experimental Communications System"; IEEE Journal on Selected Areas in Communications, vol. Sac-1, No. 6, pp. 1070-1075, Dec. 1983, 6 pages.
Dostert, Klaus; "Telecommunications Over the Power Distribution Grid—Possibilities and Limitations"; Proceedings, 1997 Int'l Symposium on Power-Line communications and its Applications, Apr. 2-4, 1997, 10 pages.

Gershon, Ron et al; "A Token Passing Network for Powerline Communications" by Adaptive Networks, IEEE Transactions on Consumer Electronics, vol. 37, No. 2, 1991, 6 pages.
Goodenough, Frank; Chip Set Puts 100 Kbit/s of Data on Noisy Power Lines; Electronic Design, Mar. 18, 1996, 9 pages.
Hachman, Mark; Compaq to Ride the CEBus; EBN, Jan. 22, 1996, one page.
Herbold, Jacob et al; "Banish Those 'Wall-Warts' with power over Ethernet"; Electronic Design, Oct. 27, 2003, 8 pages.
Hoffman, J.; "Cable, Television, and the Consumer Electronic Bus"; Panasonic Technologies, Inc., pp. 165-173.
Johnson, Johna Till; "Videohub Cuts Costs, Opens Options"; Data Communications, Feb. 1992; 4 pages.
Markwalter, Brian et al; CEBUs Router Testing; IEEE Transactions on Consumer Electronics, Nov. 1991, vol. 37, No. 4, 8 pages.
Metcalfe, Bob; "Cheap, Reliable Powerful 'Net Connections May Be as Close as an Electrical Socket"; InfoWorld, Feb. 10, 1997, vol. 19, issue 6 (4 pages).
Nichols, Keith; "Line-Carrier Modems (Part 1)", CRC Electronics, Jul. 1988, pp. 87-91.
Nichols, Keith; "Line-Carrier Modems (Part 2)", CRC Electronics, Aug. 1988, pp. 88-96.
Propp, Michael, Dr.; "The Use of Reliable Communications in Telemanagement Trials"; Proceedings, 1997, International Symposium on Power-Line Communications and its Applications, $2^{nd}$ Ed., 9 pages.
Radford, Denny; "Spread-spectrum Data Leap Through AC Power Wiring"; IEEE Spectrum, Nov. 1996. pp. 48-53.
Sheets, William et al' "Carrier Current Audio Transmitter"; Radio Electronics, Jan. 1989, 5 pages.
Sheets, William et al' "Carrier Current Receiver"; Radio Electronics, Feb. 1989, vol. 60, No. 2), 6 pages.
Strassberg, Dan; Home Automation Buses: Protocols Really Hit Home; EDN Design Feature, Apr. 13, 1995, 9 pages.
Trowbridge, Dave; "High Cost of Wiring Sparks Wireless LAN Alternatives"; Computer Technology Review, vol. XIV, No. 3, Mar. 1994, 8 pages.
Vun, Nicholas, et al; "A Power LAN for Telecommunication Power Supply Equipment; IEEE Region 10 Conference on"Computer, Communication, Control and Power Engineering, 1993, pp. 24-27, vol. 3 of 5.
Wildstrom, Stephen; "Now This is Plug and Play"; Business Week, Updated Jun. 14, 1997, 2 pages.
Communications System Uses Standard Powerlines; Computer Design, Nov. 1995 (3 pages).
Intelogis Simplifies Networking (Passport Plug-In Network); Jul. 20, 1998, 1 page.
"Spread Spectrum Carrier Technology Enabling Reliable Communications Over Noisy Media"; Intellon, 8 pages.
LTS-10 SLTA Core Module Model 65200; Echelon, 1993, 12 pages.
"Powerline Network Communications Module"; Adaptive Networks Printed 11-88 (2 pages).
"Data Transmission Without Wires"; Material Handling Engineering, 1993, 1 page.
Powerhouse Wireless Remote Controls; http://web.archive.org/web/19970209054822.x10remo.htm. 3 pages.
Powerhouse Wireless Wall Switches. http://web.archive.org/web/19970209054911/x10.com/x10wws.htm. 3 pages.
RCA Wireless Phone Jack for DirecTV from Amazon.com website. 5 pages.
Echelon Customer Support Alert Re: RTR-10 Core Module and RTR-10 Motherboard Changes, Jan. 1996, 2 pages.
NE5050 Power line modem product specification; Philips semiconductors, Apr. 15, 1992, 6 pages.
EIA-600.31—PL Physical Layer & Medium Specification; pp. 1-24.
EIA-600.37—Symbol Encoding Sublayer; Revision: May 12, 1995, 30 pages.
EIA-600.38—Power Line/RF Symbol Encoding Sublayer, Revision May 12, 1995; 64 pages.
IS-60.04; Node Communications Protocol Part 6: Application Layer Specification; Revision Apr. 18, 1996; 129 pages.
EIA-600.42—Node Medium Access Control Sub-layer; Revision IS-60 Feb. 22, 1996; 54 pages.

EIA-600.41 Description of the Data Link Layer; Revision Jan. 31, 1996; 60 pages.
EIA-600.10—Introduction to the CEBus Standard; Revision Feb. 5, 1995; 19 pages.
Fieldbus Standard for use in Industrial Control Systems, Part 2: Physical Layer Specification and Service Definition; ANSI/ISA-S50.02-1992 Approved May 17, 1994; 106 pages.
Evans, Grayson; The CEBus Standard User's Guide; 1st edition, 1996; 317 pages.
Evans, Grayson, *CEBus Standard User's Guide: A Complete Technical Overview*, May 1996, pp. 1-2, 1-3, 2-3, 2-7, 2-8, 2-9, 4-1, 4-2, 5-7, 6-8, 6-9, 6-14 to 6-25, 6-41, 6-42, 6-57 to 6-60, 6-65 to 6-68, 7-38, 7-51 to 7-54.
Office Action from the Korean Patent Office dated Feb. 2, 2007 for application No. KR-10-2002-7014029.
Office Action from the Korean Patent Office dated Jul. 10, 2008 for application No. KR-10-2008-7006206.
EIA-600.35 RF Physical Layer and Medium Specification; Revision: IS-60, Aug. 30, 1995 (17 pages).
EIA-600.37 Symbol Encoding Sublayer; Revision: Nov. 15, 1991; May 12, 1995 (30 pages).
EIA-600.38 Power Line / RF Symbol Encoding Sublayer; Revision Nov. 15, 1991; May 12, 1995 (64 pages).
EIA 600.81 Common Application Language (CAL) Specification; Revision SP3484 Rev Sep. 17, 1996 (126 pages).
EIA 600.82 CAL Context Description; Revision SP3485 Rev Feb. 2, 1996 (17 pages).
Mark Hachman, Compaq to Ride The CEBus; EBN Jan. 22, 1996 (1 page).
JVC VIPSLAN-10 Infrared Wireless LAN system; date unknown (10 pages).
Peter Clegg, VIPSLAN-10 Streaks Off the Wire; LAN Times Dec. 18, 1995 (1 page).
VIPSLAN-10; Source LAN Magazine, Sep. 1995 (11 pages).
JVC Introducing VIPSLAN-10; date unknown (2 pages).
JVC Satellite; date unknown (2 pages).
JVC Node; date unknown (2 pages).
JVC Station; date unknown (2 pages).
JVC PC Card & Mobile; date unknown (2 pages).
JVC Power Hub; date unknown (1 page).
JVC T-Adapter; date unknown (1 page).
Optical wireless Systems and Networks; IEEE Communications Dec. 1998 vol. 36 No. 12 p. 70-71 (4 pages).
GSM Over Ethernet; IEE Review Mar. 2002 (6 pages).
High Cost of Wiring Sparks Wireless LAN Alternatives; Computer Technology Review vol. XIV No. 3, Mar. 1994 (8 pages).
J. Hofmann, Cable, Television, and the Consumer Electronic Bus; date unknown (9 pages).
VISPLAN-10 Infrared Wireless LAN system; JVC May 1996 (10 pages).
'JVC introduces Ethernet compatible wireless LAN system'; Business Wire Sep. 26, 1995 (1 page).
Ethernet Wireless LAN Systems; Byte Feb. 1996 (3 pages).
'JVC introduces first Ethernet compatible wireless LAN system'; Business Wire Nov. 8, 1995 (1 page).
Zeino, H.; Misson, M.; "Functional Approach to a Hybrid Wireless Network for Mobile Stations"; Personal, Indoor and Mobile Radio Communications, 1994. 5th IEEE International Symposium on Sep. 18-23, 1994; vol. 3, pp. 994-998.
Pahlavan, K.; Probert, T.H.; Chase, M.E.; "Trends in Local Wireless Networks"; Communications Magazine, IEEE, Issue: 3, Mar. 1995, vol. 33, pp. 88-95.
Dastangoo, S.; Eftekari, R.; Tran, H.;"Wireless LAN Technologies and Applications"; MIilcom '93. Conference record. IEEE vol. 2, pp. 497-501.
Lior Ophir; Yigal Bitran; "802.11 Over Coax—A Hybrid Coax—Wireless Home Network Using 802.11 Technology"; Texas Instruments, 6 pages.
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.
Powerhouse Wireless Remote Controls: Apr. 5, 2008 (3 pages).
Powerhouse Wireless Wall Switches: Apr. 5, 2008 (3 pages).
JVC VIPSLAN-10 Infrared Wireless LAN system; May 1996. (10 pages).
JVC Introducing VIPSLAN-10; Jan. 18, 2007 (2 pages).
JVC Satellite; Jan. 18, 2007 (2 pages).
JVC Node; Jan. 18, 2007 (2 pages).
JVC Station; Jan. 18, 2007 (2 pages).
JVC PC Card & Mobile; Jan. 18, 2007 (2 pages).
JVC Power Hub; Jan. 18, 2007 (1 page).
JVC T-Adapter; Jan. 18, 2007 (1 page).
J. Hofmann, Cable, Television, and the Consumer Electronic Bus, Symposium Record, 15th International TV Symposium, Jun. 11, 1987, Montreux, Switzerland (9 pages).
Lior Ophir; Yigal Bitran; "802.11 Over Coax—A Hybrid Coax—Wireless Home Network Using 802.11 Technology"; Texas Instruments, 2004, 6 pages.
*Cisco Systems, Inc.* v. *Mosaid Technology Inc.*, redacted, public version Complaint filed in the United States District Court for the District of Delaware, Aug.16, 2010 (full version of the Complaint having been filed under seal and thus unavailable to the public).

* cited by examiner

FIGURE 1 (PRIOR-ART)

FIGURE 2 (PRIOR-ART)

FIGURE 3 (PRIOR-ART)

FIGURE 4 (PRIOR-ART)

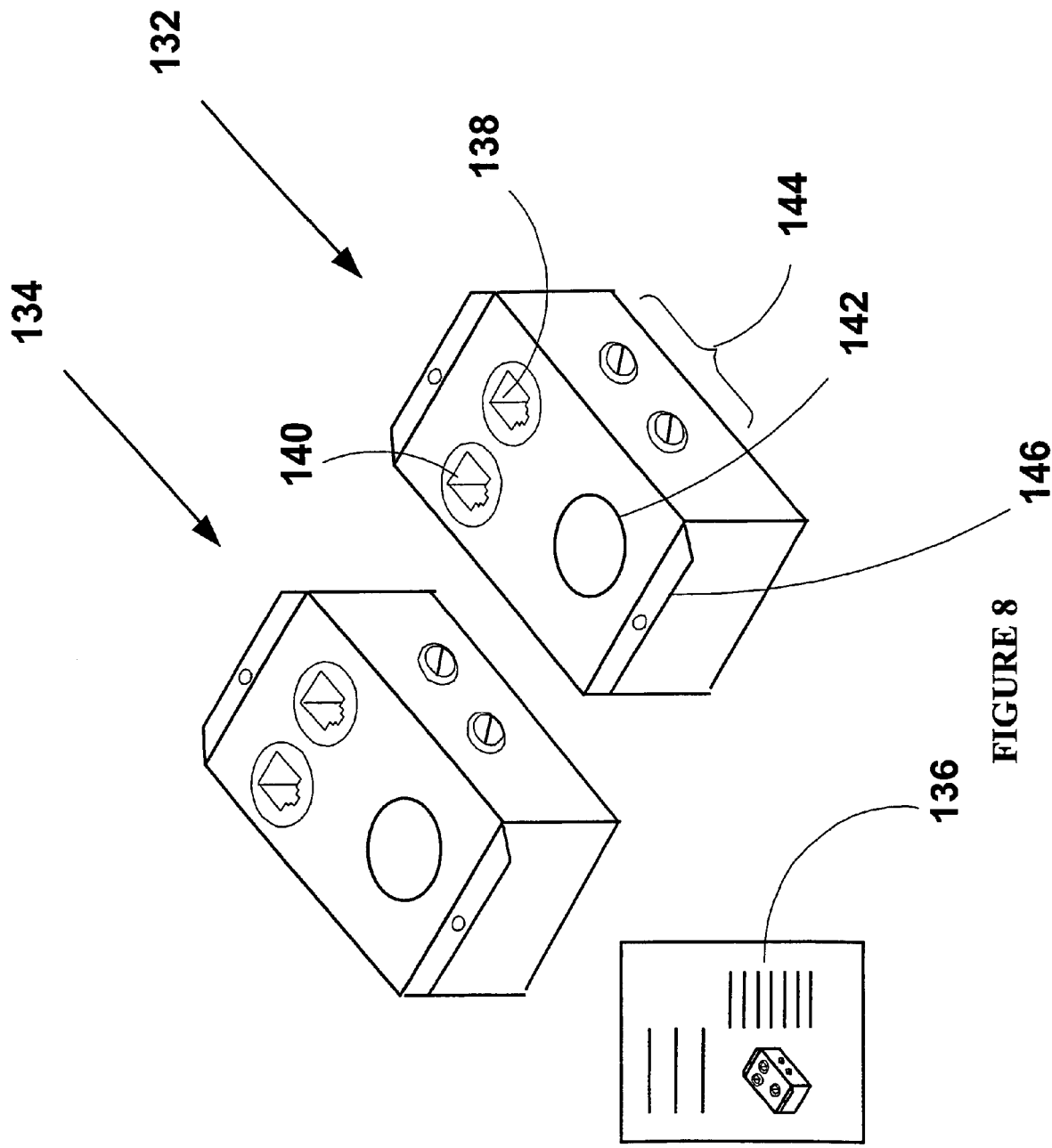

NETWORK COMBINING WIRED AND NON-WIRED SEGMENTS

CROSS-REFERENCE TO RELATED APPLICATION

This application is a continuation of pending U.S. application Ser. Nos. 10/998,015, filed on Nov. 29, 2004; 09/552,564 filed on Apr. 19, 2000; and 10/890,199, filed on Jul. 14, 2004, the disclosures of which are incorporated herein by reference.

FIELD OF THE INVENTION

The present invention relates to the field of communication networks, and, more specifically, to the networking of devices within a building via combined wired and non-wired communication.

BACKGROUND OF THE INVENTION

There is a growing need for networking within the home. This need is driven by two major factors, the increasing use of multiple data devices and the emergence of broadband services in the home.

Lately there has been an expansion in the number of homes in the USA with multiple personal computers. In addition, connectivity and networking capabilities have been added to appliances, such as refrigerators and microwave ovens. Furthermore, there is a trend toward enabling data connectivity among various multimedia (audio and video) appliances such as TV's, VCR's, receivers, and speakers. The term "data unit" as used herein denotes any device capable of generating and/or receiving data. The networking of data units enables the sharing of files and applications as well as the sharing of common peripheral devices, along with other benefits.

Another driving force behind the need for home connectivity products is the growth in the number of on-line households. As high-speed connections to information and broadband entertainment sources soar, there is a growing need to share and distribute this access among appliances within the house. These broadband services are supplied mainly by three types of service providers:
  1. Telco's, via xDSL connections (currently ADSL, to be followed by VDSL).
  2. CATV. Currently via Cable-Modem, to be followed by digital Set-Top-Box.
  3. Wireless connections, such as Satellite, LMDS, WLL, and others.

Communication within a home can be classified into two types: wired and non-wired. These are covered below:

Wired Communication

Wired communication requires using at least two distinct electrical conductors. The wiring can be new wiring installed and dedicated for data communication within the home, such as installing structured wiring such as Category 5 type, used in Ethernet IEEE802 networks. However, the installation of a new wiring structure within a home is labor-intensive, complex, and expensive. Alternatively, existing home wiring, which was previously installed for a specific purpose, can be used for data communication without substantially affecting or degrading the original service. Existing wiring includes telephone wiring, power line wiring, and cable TV wiring. These are reviewed below.

For all wired configurations, the present invention relies upon electrically-conducting lines which may be pre-existing within a building, which have at least two distinct electrical conductors, and which are capable of transporting data communication signals. Furthermore, the present invention relies upon suitable outlets, to which the electrically-conducting lines are coupled, and which are capable of connecting to external devices.

Telephone Wiring

In-home telephone service usually employs two or four wires, and is accessed via telephone outlets into which the telephone sets are connected.

FIG. 1 shows the wiring configuration of a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 Khz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new in the home. A plurality of telephones 13a and 13b connects to telephone lines 5 via a plurality of telephone outlets 11a, 11b, 11c, and 11d. Each outlet has a connector (often referred to as a "jack"), denoted in FIG. 1 as 12a, 12b, 12c, and 12d, respectively. In North-America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically the same paired conductors.

While network 10 exhibits serial or daisy-chained topology wherein the wiring is serialized from an outlet the next one only, other topologies such as star, tree or any arbitrary topology may also exist. However, the telephone wiring system within a residence is always composed of wired media: two or four copper wires, and several outlets which provides direct access for connecting to these wires.

There is a requirement for simultaneously using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form LAN over two-wire telephone lines, but without the telephone service.

As an another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such mechanism, the telephone service is not affected, while data communication capability is provided over existing telephone wiring within a home.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

The Dichter network is illustrated in FIG. 2, which shows a network 20 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers (the term "transceiver" herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, in a second embodiment (shown in FIG. 2) low pass filters (LPF's) 21a, 21b, and 21c are added to telephones 13a, 13b, and 13c from telephone line 5. Furthermore, a low pass filter is also connected to Junction Box 16, in order to filter noises induced from or to the PSTN wiring 17. It is important to note that lines 5a, 5b, 5c, 5d, and 5e are electrically the same paired conductors.

Additional prior-art patents in this field can be found under US Class 379/093.08, which relates to carrying data over telephone wiring without any modifications made to the telephone wiring (e.g. wires and outlets). U.S. Pat. No. 5,841,360 and U.S. patent application Ser. Nos. 09/123,486 and 09/357,379 to the present inventor are the first to suggest modifying the telephone wiring, by means of splitting the wiring into distinct segments, each of which connects two telephone outlets. In this way, the network is modified from 'bus' topology into multiple 'point-to-point' segments, enabling superior communication characteristics.

Part of such a network 30 is shown in FIG. 3, describing outlets 31a and 31b, substituting outlets 11 of FIGS. 1 and 2. The telephone wiring 5 is split into distinct segments 5a, 5b and 5c. Low-Pass Filter (LPF) and High-Pass Filters (HPF) are coupled to each wire segment end, in order to split between the telephony and the data signals. As shown in FIG. 3, LPF's 21b and 21c are attached to each end of wiring segment 5b. The LPF's are designed to allow passing of the telephony signals, and are connected together thus offering a continuous path for the telephony signals. Access to the telephony signals is made via connectors 12a and 12b in the outlets, into which telephone devices 13a and 13b are connected via connectors 14a and 14b respectively. Thus, the telephony service is fully retained. The data signals, carried in the high part of the spectrum, are accessed via HPF's 26a and 22b, coupled to each end of the telephone wire segment 5b. HPF's 22a and 26b are connected to the ends of the wire segments 5a and 5c respectively. Each HPF is connected to a modem 23 and 27, which transmit and receive data signals over the telephone wiring. Modems 23a, 27a, 23b, and 27b are connected to HPF's 22a, 26a, 22b and 26b respectively. Data units 24a and 24b are connected to the outlets 31a and 31b respectively, via a connector (not shown in the Figure) in the outlet. The data units are coupled via DTE interface in the outlet. Outlets 31a and 31b comprise DTE interfaces 29a and 29b respectively. The three data streams in each outlet, two from each modem and one from the DTE, are handled by an adapter 28a and an adapter 28b, which serve outlets 31a and 31b, respectively. While FIG. 3 describes an embodiment wherein all the components for the relevant functions are housed within the outlet, other embodiments are also possible, wherein only some of the components for these functions are contained within the outlet.

Power Lines

It is possible to transmit data over wiring used for distribution of electrical power within the home, which is normally at a frequency of 50 or 60 Hz. Access to the power is available via power outlets distributed around the house. Such wiring consists of two wires (phase and neutral) or three wires (phase, neutral, and ground).

FDM techniques, as well as others, are used for enabling data communication over power lines. Many prior-art patents in this field can be found in US Class 340/310.

Cable Television Lines

It is also possible to transmit data over wiring used for the distribution of television signals within the home. Such wiring usually is coaxial cable.

Both power line and cable television wiring systems resemble the telephone line structure described in FIG. 1. The wiring system is based on conductors, usually located in the walls, and access to these wires is obtained via dedicated outlets, each housing a connector connected directly to the wires. Common to all these systems, is the fact that the wiring was installed for a dedicated purpose (telephone, power, or cable TV signal distribution). Wherever one of these existing wiring systems is used for carrying data, it is desirable that the original service (telephony, power, or television signal distribution) be unaffected. Dedicated modems are used for carrying data over the media concurrently with the original service.

When using existing wiring, specific wired modems are normally required for communicating over the electrically-conducting lines, and access to the electrically-conducting lines is provided via the relevant outlets. Using electrically-conducting lines as the communication media allows for high bandwidth, and provides robust and cost-effective communication. In addition, communication over large distances is possible, which in most cases enables coverage of the whole house, thereby guaranteeing communication from any outlet to another within the house.

Such networks, however, require data units to be connected to the outlets, usually by means of a cable from the data unit to a suitable nearby outlet. This makes the connection complex and hard-to-use, requires the data unit to be in proximity to an appropriate outlet, and impairs mobility for some data units within the house.

Non-Wired Communication

Non-wired solutions for in-home data networking use waves propagated without an electrically-conducting medium. Three main techniques are commonly used:

1. Radio Frequency (RF). Transmission of data between data units can be accomplished with radio frequency electromagnetic signals. As an example, IEEE802.11 can be used.
2. Light. Transmission of data between data units can be accomplished with light in the visible or non-visible spectrum. Currently, the most popular is infrared (IR) based communication. Most such systems require 'line-of-sight' placement of the communicating data units.
3. Sound. Transmission of data between data units can be accomplished with sound waves, either in the audio spectrum (20-20,000 Hz), or inaudible spectrum (ultrasonic, above 20,000 Hz; or infrasonic, below 20 Hz).

It is noted that although light and radio waves are both electromagnetic phenomena, they occupy different parts of the electromagnetic spectrum and have significantly different characteristics for purposes of the present invention. Thus, light and radio waves are herein treated as distinct physical phenomena.

An example of a non-wired data network 40 is shown in FIG. 4. Two data units 41a and 41b are shown, into which non-wired transceivers 42a and 42b are respectively coupled. The non-wired transceivers 42a and 42b communicate over a space 43 without any electrically-conducting medium. If RF transmission is used, the transceivers are RF transceivers, and the communication over space 43 is based on the propagation of radio frequency electromagnetic waves. Similarly, in the case of light-based communication, transceivers 42a and 42b utilize light emitters (e.g. LEDs) and light detectors (e.g. photoelectric cell), and the communication over space 43 relies on the propagation of light. Likewise, in the case of sound-based communication over space 43, the transceivers use microphones and speakers, and the communication relies on the propagation of sound waves through the air in the space 43.

Since these solutions do not require any physical connection such as cable, they provide both ease-of-use and mobility. However, such non-wired solutions are effective over short distances only. Furthermore, most of the non-wired solutions cannot easily pass through walls and other such obstructions, owing to the attenuation to the signals. Hence, such techniques are suitable for communication within a single room, but are not suitable for communication between the rooms of a home or other building.

There is thus a widely recognized need for, and it would be highly advantageous to have, a means for implementing a data networking in-home between data units, wherein such data units can be networked within a home or other building, while providing mobility and ease of use. This goal is met by the present invention.

SUMMARY OF THE INVENTION

The present invention discloses a data communication network within a building having wired and non-wired segments. The wired segments are based on electrically-conducting lines installed within the building. In addition to supporting data communication, these electrically-conducting lines concurrently distribute a primary service other than the transport of data communication signals, such as telephone service, electrical power service, or cable television service, and may be pre-existing wires originally-installed to distribute the primary service. Dedicated outlets are used to enable direct access to the wiring. The present invention uses means for utilizing the electrically-conducting lines concurrently for both the transport of data communication signals and the primary service, without any interference between these two uses. The non-wired segments employ communication without electrically-conducting media, via waves propagated through open space, such as by light or radio waves, or by acoustic waves in air.

The wired and non-wired segments are combined by means of circuitry in one or more outlets. The coupling device is a module containing one port for coupling to the wired network using a specific wired modem. Another port of the device couples to the non-wired segment, using a non-wired modem. An adapter handles the data flow between the wired segment and the non-wired segment, and has provision for protocol conversion, if required.

The module coupling both segments, or any of the components of the module, can be fully integrated into the outlet, partially integrated into the outlet, or externally coupled to it.

Therefore, according to the present invention there is provided a local area network within a building for transporting data among a plurality of data units, the local area network including at least one wired segment and at least one non-wired segment, wherein the at least one wired segment includes: (a) at least one electrically-conducting line within the building, the electrically-conducting line having at least two conductors and operative to transport data communication signals; (b) at least two outlets, each operative for coupling to the electrically-conducting line; and (c) at least one wired modem coupled to the electrically-conducting line, operative to communicate over the electrically-conducting line; (d) and wherein the at least one non-wired segment is operative to communicating data without electrically-conducting media and includes at least one non-wired modem, wherein at least one of the outlets couples a wired segment to a non-wired segment, and wherein the at least one electrically-conducting line is furthermore operative for concurrently distributing a service other than the transport of data communication signals.

BRIEF DESCRIPTION OF THE DRAWINGS

The invention is herein described, by way of example only, with reference to the accompanying drawings, wherein:

FIG. 8 shows a kit for upgrading existing electrically-conducting lines to support a network according to the present invention.

DETAILED DESCRIPTION OF THE INVENTION

Figure 1:
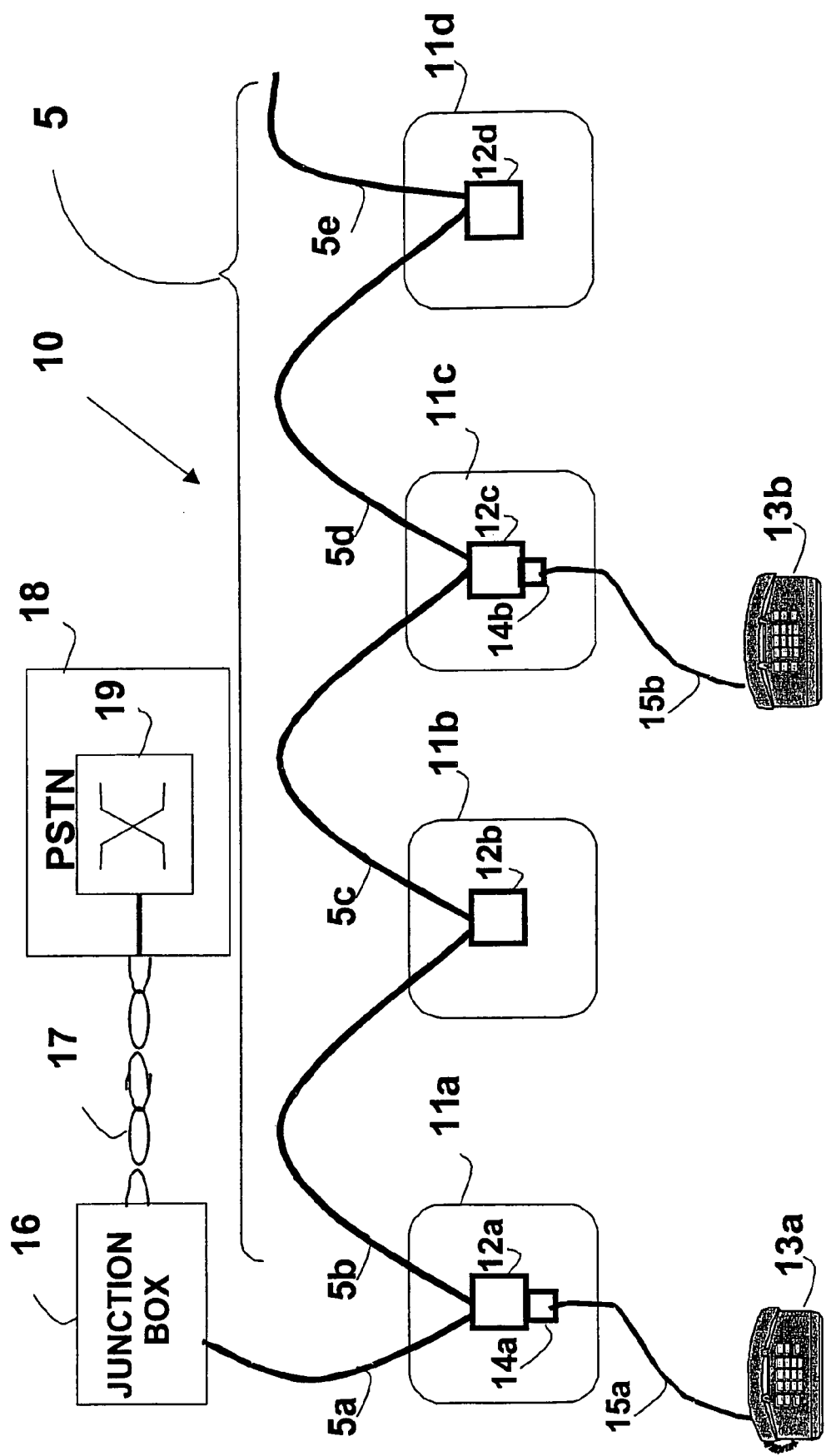
FIG. 1 shows a common prior art telephone line-wiring configuration for a residence or other building.
Figure 2:
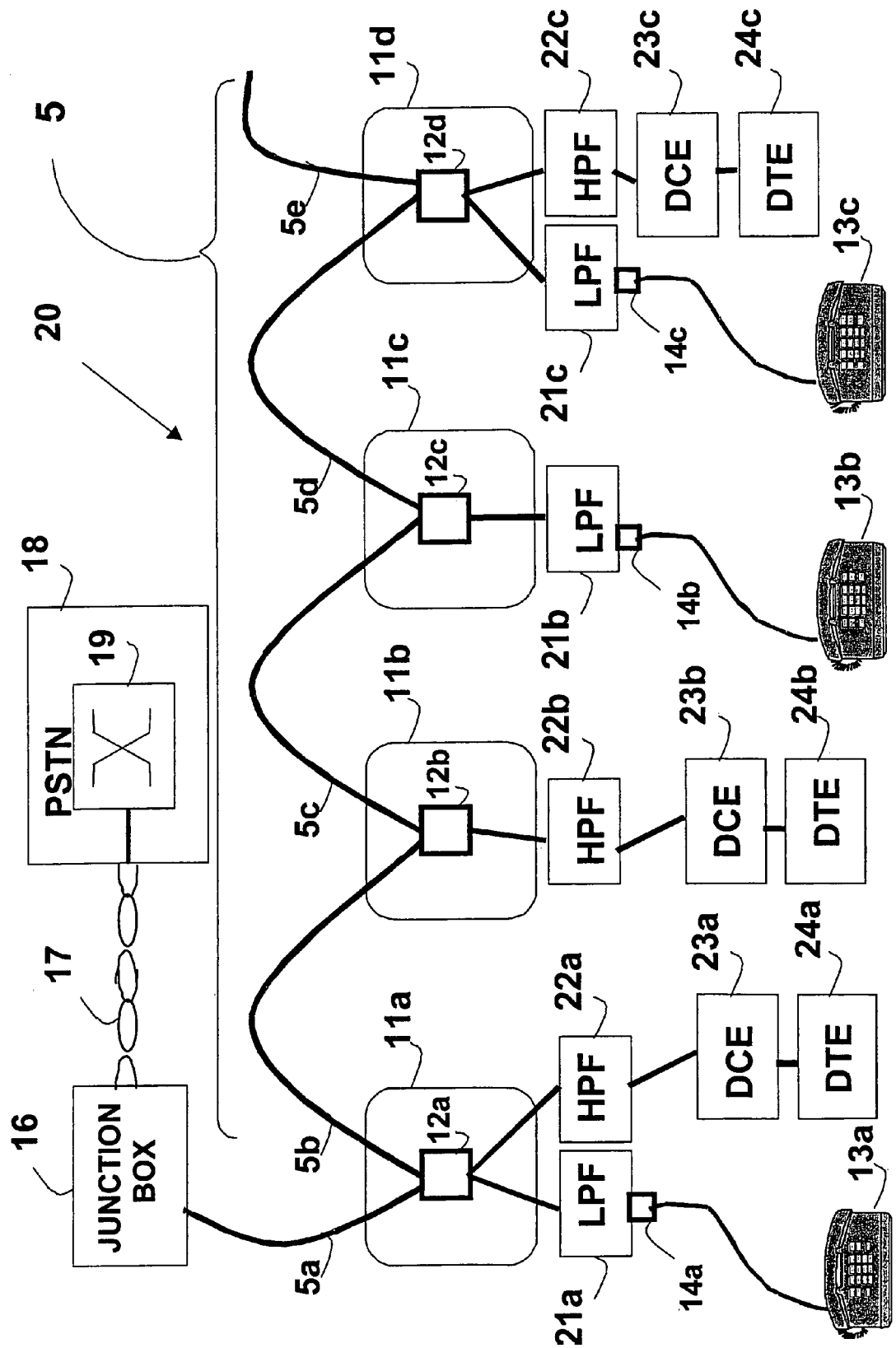
FIG. 2 shows a first prior art local area network based on telephone line wiring for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 5:
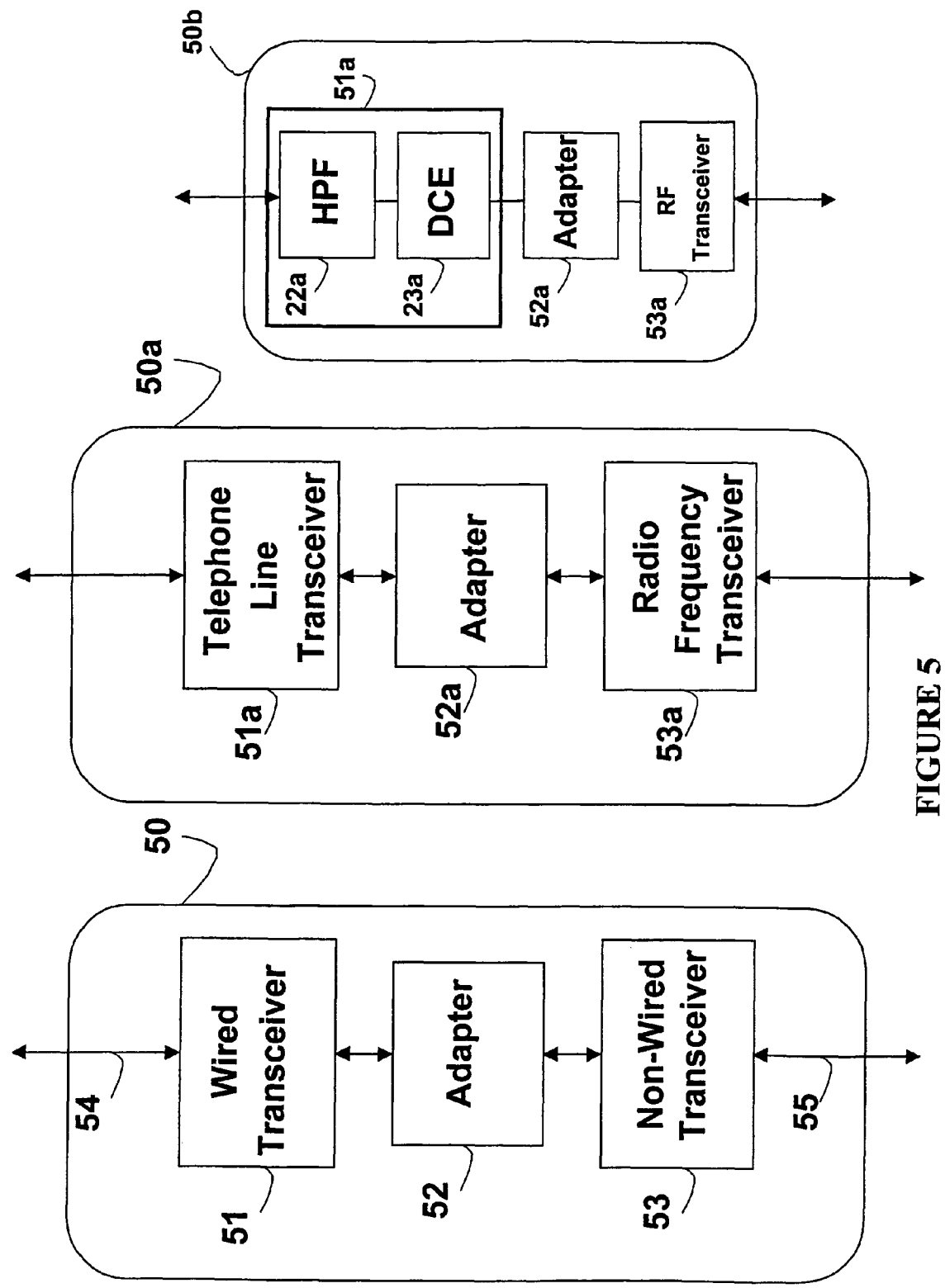
FIG. 5 shows modules according to the present invention.

The invention is based on a wired/non-wired network adapter module (hereinafter referred to as "module"). A functional description of such a module 50 is shown in FIG. 5. The module comprises a physical port 54 for connecting to the wired network. The communication with the wired network is carried by wired transceiver 51. Wired transceiver port 54 and transceiver 51 are dependent upon the type of wired network. Interfacing a telephone line-based network requires a telephone line transceiver, while connecting to a power line network requires a power line dedicated modem. Additionally, the connection to the wired network may require specific means in order to meet regulatory and safety requirements, as well as specific means for ensuring that the basic service (e.g. telephony service, power distribution) is not substantially degraded or affected.

The non-wired segment interfaces via a port 55. Port 55 communicates without an electrically conducting medium. Communication with this non-wired segment is handled by a non-wired modem/transceiver 53. The term "non-wired modem" herein denotes any device capable of data communication without requiring an electrically conducting medium. The data to and from the wired segment and the data to and from the non-wired segment are handled by a protocol adapter 52. Protocol adapter 52 may serve as a transparent unit, acting as a repeater/regenerator, dealing with the physical layer only of the OSI model. However, higher layers can also be handled by the protocol adapter 52. In such a case, the protocol adapter will function as a bridge, router, gateway or any other adaptation mechanism as required.

Other facilities of module 50 may contain logic, control, processing, storage, power-supply and other components not shown in FIG. 5. The communication supported by module 50 can be simplex (unidirectional, either from the wired towards the non-wired segment or vice-versa), half-duplex, or full duplex. A module 50a connects a telephone line network segment to an RF network segment. Module 50a employs a telephone line modem 51a as the wired network interface, a radio-frequency modem 53a as an interface to the non-wired network segment, and a protocol adapter 52a. A module 50b is an embodiment of the present invention, in which the telephone line transceiver can be implemented by a high-pass filter (HPF) 22a and data terminal equipment (DCE) 23a, as also used by Dichter as discussed previously.

Figure 6:
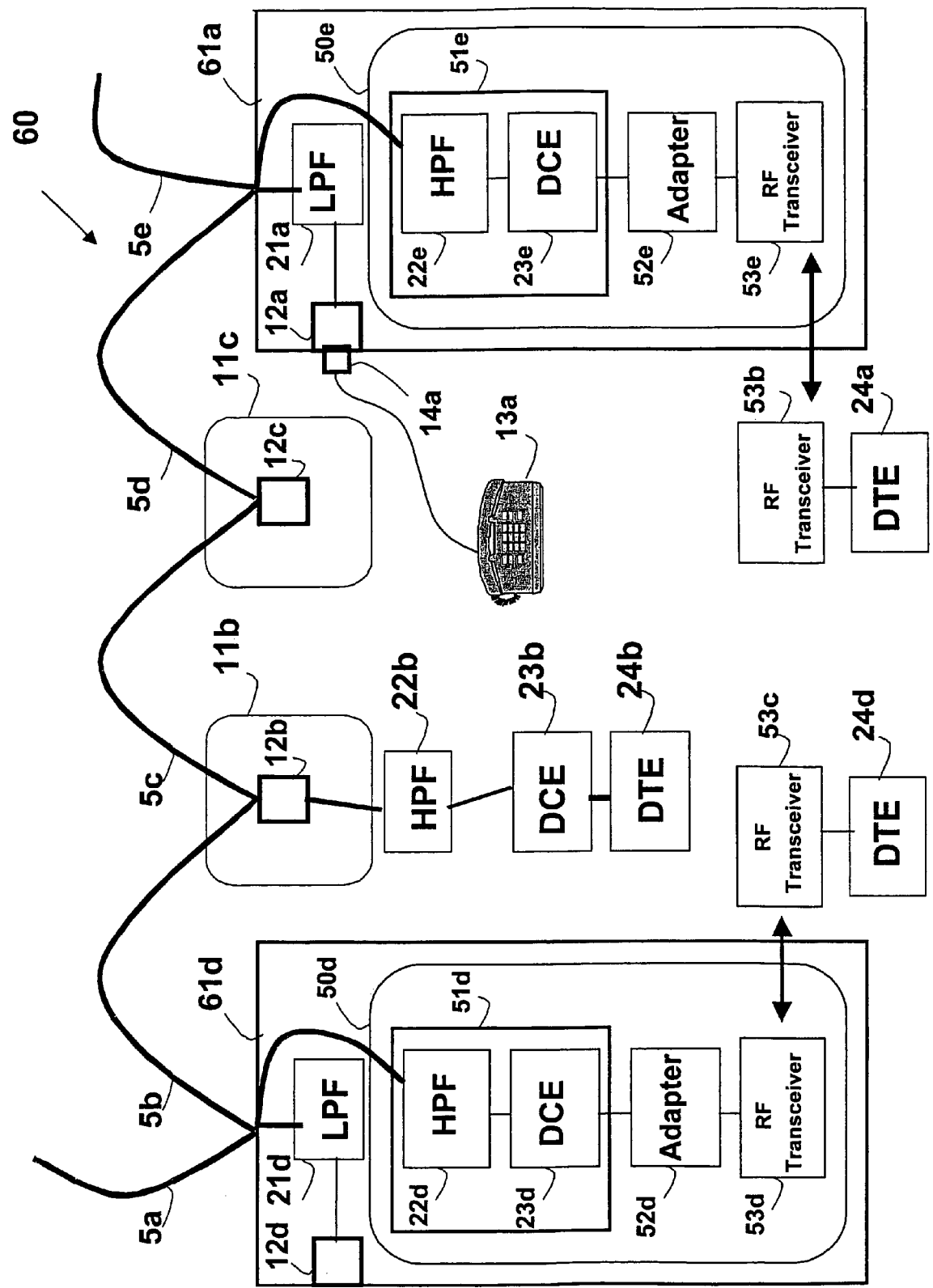
FIG. 6 shows a local area network according to the present invention, wherein telephone wiring used for the wired segment and radio-frequency communication for the non-wired segment.

FIG. 6 shows an embodiment of a network 60 according to the present invention that includes wired and non-wired segments. The wired segment is based on telephone wiring 5 within a building as described in FIG. 1. While outlets 11b and 11c are unchanged, outlets 11a and 11d are replaced by outlets 61d and 61a, respectively, containing modules 50d and 50e respectively. Basic telephone service is retained by employing low-pass filters (LPF) 21d and 21a in outlets 61d and 61a respectively. The LPF's are coupled to telephone connectors 12d and 12a respectively, enabling connection of telephone devices. This is illustrated by a telephone 13a connected by connector 14a to connector 12a in outlet 61a. A Dichter-type data communication network is established by connecting data terminal equipment (DTE) via a modem and HPF, as illustrated by DTE 24b connected to DCE 23b, which is coupled to HPF 22b, which is in turn directly coupled to telephone wiring 5 via connector 12b in outlet 11b.

The non-wired part of network 60 is based on radio frequency transmission, utilizing a pair of RF transceivers 53 (FIG. 5). As shown in FIG. 6, DTE's 24d and 24a are coupled to RF transceivers 53c and 53b, respectively. In turn, each such RF transceiver communicates with RF transceivers 53d and 53a, respectively, which are integrated within outlets 61d and 61a, respectively.

Integrating the wired and non-wired segments of the network is accomplished by modules 50d and 50e, each of which is illustrated by module 50c in FIG. 5. Modules 50d and 50e are integrated within outlets 61d and 61a, respectively. Each such module interfaces the wired segment of the network by a telephone modem. Each such modem contains a high-pass filter 22 and DCE 23, as described previously for a Dichter-type network. Interfacing to the non-wired segment of network 60 is performed via an RF transceiver, wherein modules 50d and 50e comprises RF transceivers 53d and 53e respectively. Protocols and data conversion between both segments are performed by adapter 52 (FIG. 5), wherein adapters 52d and 52e are integrated within modules 50d and 50e respectively.

Network 60 allows DTE's 24d, 24b and 24a to communicate among themselves. While DTE 24b is connected to the network via a wired connection, DTE's 24d and 24a can communicate in a non-wired manner. While FIG. 6 illustrates a single DTE connected by wires and two DTE's connected without wires, it is obvious that any number of DTEs of each type can be connected. Furthermore, while in network 60 each outlet supports a single wired or non-wired DTE connection, other implementations can also be supported. For example, an outlet can provide one or more wired connections simultaneously with one or more non-wired connections.

While FIG. 6 illustrates the case where module 50 is integrated in an outlet 61, embodiments of the present invention also include those wherein the module is external to the outlet. Similarly, selective parts of a module may be integrated within an outlet while other parts are external. In all cases, of course, appropriate electrical and mechanical connection between the module and the outlet are required.

A network outlet is physically similar in size, shape, and overall appearance to a standard outlet, so that a network outlet can be substituted for a standard outlet in the building wall. No changes are required in the overall telephone line layout or configuration.

Network 60 provides clear advantages over hitherto proposed networks. For example, DTEs (e.g. PC's) located in different rooms can interconnect without the need to use any wires. A radio-frequency transceiver in each DTE communicates with the nearest outlet, and the outlets communicate between rooms over the telephone wiring media.

Figure 3:
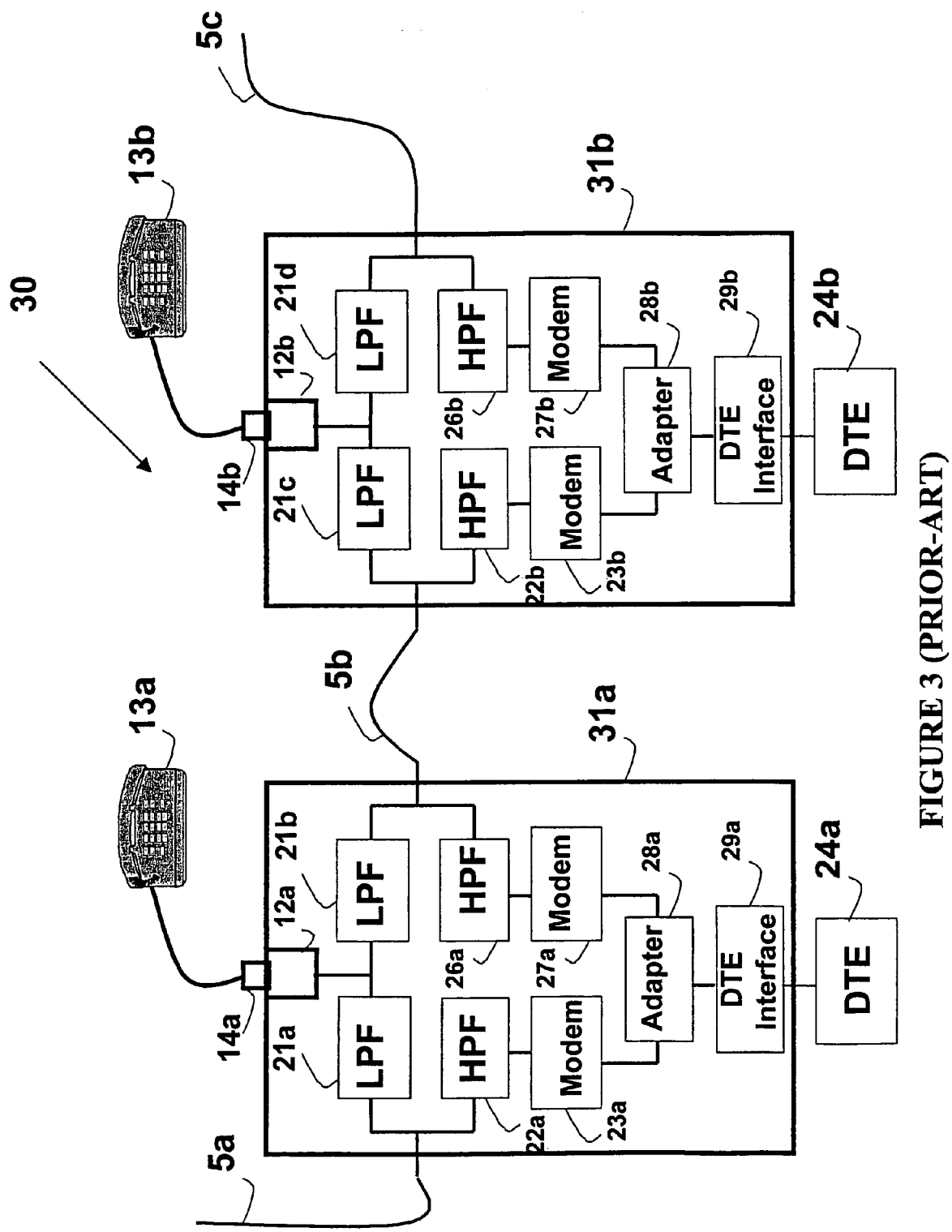
FIG. 3 shows a second prior art local area network based on telephone line wiring for a residence or other building.
Figure 4:
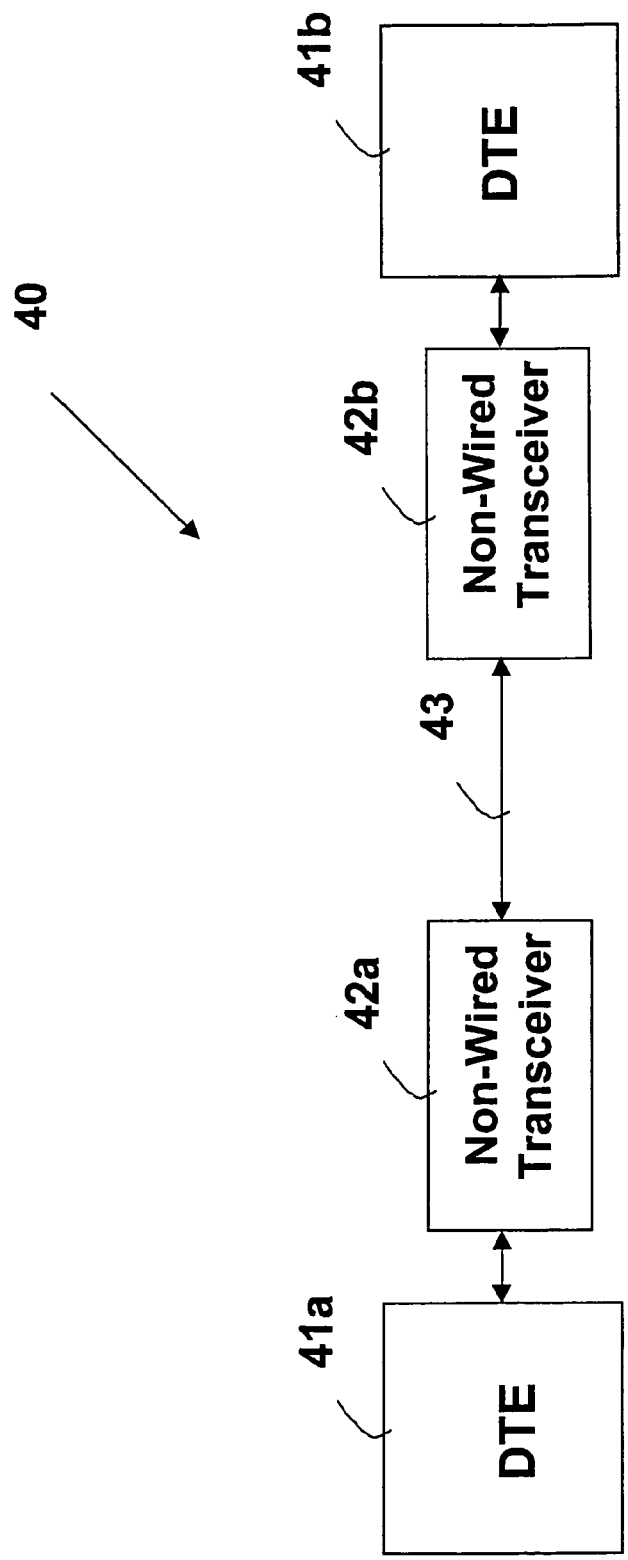
FIG. 4 shows a prior art non-wired communication network.
Figure 7:
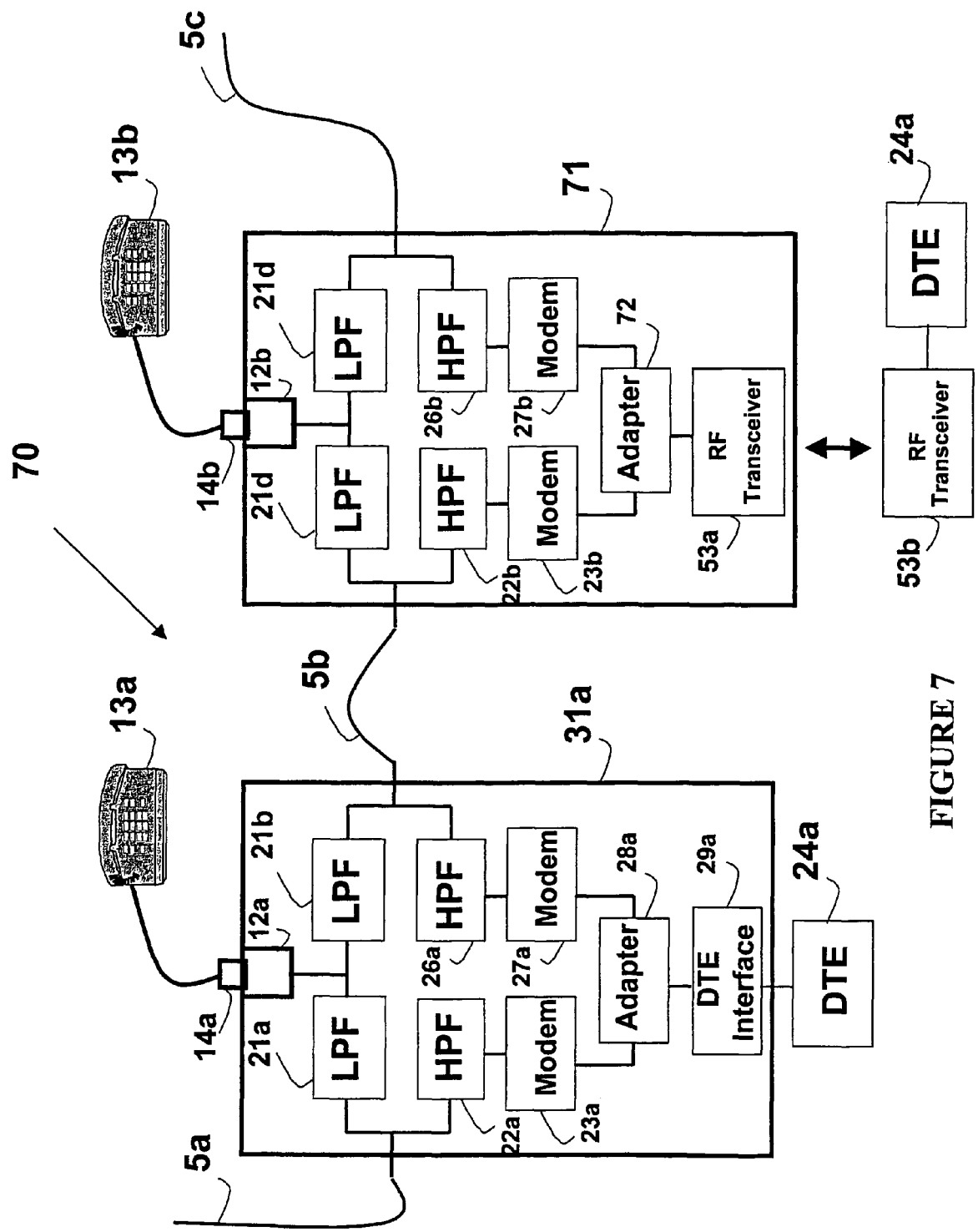
FIG. 7 shows a second embodiment of a local area network based on telephone lines as the wired segment and radio frequency communication for the non-wired segment.

The invention can equally well be applied to the prior art wired network illustrated in FIG. 3. FIG. 7 shows part of a network 70. Outlet 31a represents a prior-art network outlet. In order to interface to the non-wired network segments, an outlet 71 according to the present invention must be used. With the exception of RF transceiver 53a within outlet 71, which communicates with RF transceiver 53b connected to a DTE 24a, outlet 71 is similar to outlet 31a. In this embodiment, the module includes two telephone line modems 23b and 27b, a three-port adapter 72 (for the two wired ports and the single non-wired port), and RF transceiver 53a. The advantages offered by the prior-art topology apply also for this configuration.

While the present invention has been described above for the case where the wired media is based on a telephone line system and includes telephone wires and telephone outlets, the present invention can equally well be applied to other wired systems such as those based on power and cable television signal distribution. In the case of an electrical power distribution system, the electrical wires and outlets employed for power distribution in the house are used. Similarly, cable television wiring and outlets can also be used. In all cases, it may be necessary to retain the basic service for which the wiring systems were installed: telephony service, electrical power distribution, or television signals. This is usually achieved by adding the appropriate circuitry to separate the data communication network from the basic service, as well as to avoid interference of any kind between the two roles currently employing the same wiring. For example, the LPF's 21*a*, 21*b*, 21*c*, and 21*d*; and HPF's 22*a*, 22*b*, 26*a*, and 26*b* (FIG. 7) serve the role of separating the telephony service from the data communication network and vice-versa.

While the present invention has been described above for the case wherein the non-wired communication is accomplished by radio-frequency transmission, the present invention can be equally applied to other types of non-wired communication, such as:

1. Non-wired communication accomplished by other forms of electromagnetic transmission. Electromagnetic waves in various parts of the electromagnetic spectrum can be used for communication. For example, low-frequency electromagnetic radiation can be used to transmit audio-frequency signals over short distances without a carrier. Radio-frequency transmission is a special case of this general electromagnetic transmission. As noted previously, light is also a special case of electromagnetic radiation, but is herein treated separately because of the characteristics of light are distinctly different from those of electromagnetic transmission in other usable parts of the electromagnetic spectrum.
2. Non-wired communication accomplished by light. Either visible or non-visible light wavelength can be used for such transmission. As previously noted, currently, the most popular is infrared (IR) based communication. Most such systems require substantially 'line-of-sight' access.
3. Non-wired communication accomplished by sound. Either audible sound (20-20,000 Hz band), or inaudible sound (ultrasonic, above 20,000 Hz; or infrasonic, below 20 Hz).

In addition to the described data communication function, the network according to the present invention can also be used for control (e.g. home automation), sensing, audio, or video applications, and the communication can also utilize analog signals (herein denoted by the term "analog communication"). For example, a video signal can be transmitted in analog form via the network.

Upgrade Kit

The present invention also contemplates a kit for upgrading existing electrically conducting lines to support a network as described above. FIG. 8 illustrates an embodiment of such a kit containing an outlet 132 and an outlet 134 and installation instructions 136. Outlet 132 has connection 144 for coupling to a wired segment and mounting points such as a flange 146 for installing in the building walls. Outlet 132 also has a jack 138 and a jack 140 for connecting to external devices via cables, and a transducer 142 for connecting to external data units via a non-wired segment. Within outlet 132 is a module according to the present invention, as previously described and illustrated in FIG. 5. In one embodiment, transducer 142 is a radio frequency transceiver. In another embodiment, transducer 142 is a combined light-emitting diode and photocell receiver. In still another embodiment, transducer 142 is a combined speaker and microphone. Likewise, in one embodiment, jack 138 is a telephone jack. In another embodiment, jack 138 is an electrical power socket. In still another embodiment, jack 138 is a cable television jack. In one embodiment, jack 140 is a data jack. The embodiment of the kit illustrated in FIG. 8 has two outlets, outlet 132 and outlet 134, which are illustrated as substantially identical. However, in another embodiment, the kit contains only outlet 132. In still another embodiment, outlet 134 does not contain a transducer. Other variations are also possible in different embodiments.

It will also be appreciated that the outlet and the adapter module may be provided as separate components for use in upgrading existing wiring of a building to support a local area network having at least one wired segment and at least one non-wired segment. They may likewise find independent use for further expanding a hybrid network that has previously been upgraded according to the invention. Such an outlet is provided with a first coupler for coupling the outlet to the at least one non-wired segment, and a second coupler for coupling the outlet to the existing wiring via an adapter module. The adapter module may be either fully or partially integrated within the outlet.

A method for upgrading existing electrically conducting lines within a building to support a network according to the present invention involves:

(a) providing a wired modem;
(b) providing a non-wired modem;
(c) providing an adapter for handling the data communications between a wired segment and a non-wired segment; and
(d) providing an outlet, and
(e) equipping the outlet with the wired modem, the non-wired modem, and the adapter.

While the invention has been described with respect to a limited number of embodiments, it will be appreciated that many variations, modifications and other applications of the invention may be made.

What is claimed is:

1. A communication apparatus for adapting existing in-building AC power lines for data communication, said apparatus comprising a module electrically and mechanically attachable to a wall-mounted electrical outlet carrying AC electrical power, said module comprising a housing containing:

(a) a powerline modem configured for bidirectional digital data communication to and from power lines leading from the outlet in accordance with a first communications protocol;
(b) an RF modem configured for bidirectional wireless digital data communication to and from a receiver inside an area of the building near the outlet in accordance with a second communications protocol; and
(c) a protocol adapter coupling the powerline modem and the RF modem.

2. The apparatus according to claim 1, wherein said wireless communication is based on IEEE802.11 standard.

3. The apparatus according to claim 1, wherein said module is further connectable to a power appliance, and said module further comprises:

a first power connector by which said module is attachable to the outlet, said power connector being connected to said powerline modem;
a low pass filter coupled to said power connector for passing only the AC electrical power; and a second power connector coupled to said low pass filter and connectable to the power appliance, for coupling the AC electrical power to the power appliance.

4. The apparatus according to claim 1, wherein said module is further connectable to a wired data unit, and said module further comprises:
a data connector connectable to the wired data unit;
a data transceiver coupled between said data connector and said digital protocol adapter, for conducting standard-based bi-directional packet-based digital data communication with the wired data unit.

5. The apparatus according to claim 4, wherein said data connector and said data transceiver are operative to constitute a standard IEEE802.3 interface.

6. The apparatus according to claim 1, wherein said apparatus is part of one of a WLL network, a LMDS network and a satellite network.

7. The apparatus according to claim 1, wherein said powerline modem is further operative for conducting standard-based bi-directional packet-based digital data communication with two or more identical powerline modems coupled to other AC power outlets connected to the AC power lines.

8. The apparatus according to claim 1, wherein said RF modem is further operative for conducting standard-based bi-directional packet-based radio frequency digital data communication with two or more identical RF modems employing a wireless radio frequency digital data signal conforming to a standard-based wireless digital data protocol.

9. A communications apparatus for adapting existing in-building AC power lines for data communications comprising:
a unit mounted on an interior wall of a room and directly connected to the AC power lines, said unit containing:
(a) a powerline modem configured for bidirectional digital data communication to and from the power lines in accordance with a first communications protocol;
(b) an RF modem configured for bidirectional wireless digital data communication to and from a receiver inside the room in accordance with a second communications protocol;
(c) a protocol adapter coupling the powerline modem and the RF modem; and
(d) a standard electrical outlet.

10. The apparatus of claim 9 wherein said unit comprises the standard electrical outlet and a module containing said powerline modem, said RF modem and said protocol adapter, which module is external to and attached to said electrical outlet.

11. The apparatus of claim 9 wherein said powerline modem, said RF modem and said protocol adapter are integrated into said standard electrical outlet.

12. The apparatus of claim 9 wherein at least one of said powerline modem, said RF modem and said protocol adapter is integrated into said standard electrical outlet.

13. The apparatus according to claim 9, wherein said wireless communication is based on IEEE802.11 standard.

14. The apparatus according to claim 9, wherein said module is further connectable to a power appliance, and said module further comprises:
a low pass filter coupled to said power connector for passing only AC electrical power carried by the AC power lines; and
a second power connector coupled to said low pass filter and connectable to the power appliance, for coupling the AC electrical power to the power appliance.

15. The apparatus according to claim 9, wherein said module is further connectable to a wired data unit, and said module further comprises:
a data connector connectable to a wired data unit;
a data transceiver coupled between said data connector and said protocol adapter, for conducting standard-based bi-directional packet-based digital data communication with the wired data unit.

16. The apparatus according to claim 15, wherein said data connector and said data transceiver are operative to constitute a standard IEEE802.3 interface.

17. The apparatus according to claim 9, wherein said apparatus is part of one of: a WLL network, a LMDS network and a satellite network.

18. The apparatus according to claim 9, wherein said powerline modem is further operative for conducting standard-based bi-directional packet-based digital data communication with two or more identical powerline modems coupled to other electrical outlets connected to the AC power lines.

19. The apparatus according to claim 9, wherein said RF modem is further operative for conducting standard-based bi-directional packet-based digital radio-frequency data communication with two or more identical RF modems employing a wireless digital data signal conforming to a standard-based wireless digital data protocol.

20. A method of adapting existing in-building AC power lines to conduct data communications comprising:
(a) detaching an existing standard electrical outlet from an interior wall of a room of a building;
(b) in place of the detached outlet, mounting a unit containing:
(i) a powerline modem configured for bidirectional digital data communication to and from the power lines in accordance with a first communications protocol;
(ii) an RF modem configured for bidirectional wireless digital data communication to and from a wireless receiver inside the room in accordance with a second communications protocol;
(iii) a protocol adapter coupling the powerline modem and the RF modem; and
(iv) a new standard electrical outlet; and
(c) directly connecting the new standard electrical outlet and the powerline modem to the AC power lines.

21. A method of adapting existing in-building AC power lines for data communications comprising:
(a) attaching, to a standard electrical outlet mounted on an interior wall of a room of a building, a unit containing:
(i) a powerline modem configured for bidirectional digital data communication to and from power lines in accordance with a first communications protocol;
(ii) an RF modem configured for bidirectional wireless digital data communication to and from a receiver inside the room in accordance with a second communications protocol; and
(iii) a protocol adapter coupling the powerline modem and the RF modem;
wherein, when so attached, the powerline modem is electrically coupled to the AC power lines.

22. A communications system network in a building, comprising:
(a) a plurality of wall-mounted standard electrical outlets carrying AC electrical power to different rooms of the building, said outlets being wired together by building wiring carrying an AC power signal;
(b) a plurality of wireless receivers inside the building; and (c) a plurality of modules, each attached externally to, and supported by, one of said outlets, each of said modules containing:
  (i) a powerline modem configured for bidirectional digital data communication to and from power lines leading from the outlet in accordance with a first communications protocol;
  (ii) an RF modem configured for bidirectional wireless digital data communication to and from at least one of the receivers in accordance with a second communications protocol; and
  (iii) a protocol adapter coupling the powerline modem and the RF modem.

23. The network according to claim 22, wherein said wireless communication is based on IEEE802.11 standard.

24. The network according to claim 22, wherein at least one of said modules is further connectable to a power appliance, and said module further comprises:
  a low pass filter coupled to said power connector for passing only the AC power signal; and
  a power connector coupled to said low pass filter and connectable to a power appliance, for coupling the AC power signal to the power appliance.

25. The network according to claim 22, wherein at least one of the modules is further connectable to a wired data unit, and said module further comprises:
  a data connector connectable to a wired data unit,
  a data transceiver coupled between said data connector and said protocol adapter, for conducting standard-based bi-directional packet-based digital data communication with the wired data unit.

26. The network according to claim 25, wherein said data connector and said data transceiver are operative to constitute a standard IEEE802.3 interface.

27. The network according to claim 22, wherein said network is part of one of: a WLL network, a LMDS network and a satellite network.

28. The network according to claim 22, wherein said powerline modem is further operative for conducting standard-based bi-directional packet-based digital data communication with two or more identical powerline modems coupled to other electrical outlets connected to the building wiring.

29. The network according to claim 22, wherein said RF modem is further operative for conducting standard-based bi-directional packet-based radio frequency digital data communication with two or more identical RF modems employing a wireless digital data signal conforming to a standard-based wireless digital data protocol.

30. A method of conducting data communication over a network in a building, comprising:
  (a) attaching, to each of a plurality of standard electrical outlets mounted on interior walls of first and second rooms of the building, a unit containing:
    (i) a powerline modem configured for bidirectional digital data communication to and from power lines in accordance with a first communications protocol;
    (ii) an RF modem configured for bidirectional wireless digital data communication to and from transceivers in accordance with a second communications protocol; and
    (iii) a protocol adapter coupling the powerline modem and the RF modem, said step of attaching causing the powerline modem to be electrically coupled to the AC power lines of the building;
  (b) placing transceivers at select locations in rooms of the building in which the units are attached to outlets;
  (c) wirelessly transmitting digital data from a transceiver in the first room;
  (d) in response to wireless transmission in step (c), automatically causing the protocol adapter of a unit in the first room to convert the digital data from the first communications protocol to the second communications protocol and applying the converted data to the powerline modem of the same unit;
  (e) in response to step (d), automatically transmitting the converted data through the AC power lines of the building to at least one of the units in the second room of the building;
  (f) in response to step (e), automatically causing the protocol adapter of the unit in the second room to reconvert the digital data from the second communications protocol to the first communications protocol and to apply the reconverted data to the RF modem of the unit in the second room; and
  (g) in response to step (f), automatically causing the RF modem of the unit in the second room to transmit the reconverted data to a transceiver in the second room.

\* \* \* \* \*